United States Patent
Shey et al.

(10) Patent No.: US 12,000,639 B2
(45) Date of Patent: Jun. 4, 2024

(54) HEAT PUMP WITH MULTIPLE VAPOR GENERATORS

(71) Applicant: Ford Global Technologies, LLC, Dearborn, MI (US)

(72) Inventors: Rachael Shey, Clawson, MI (US); Jeffrey Paul Brown, Farmington Hills, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 402 days.

(21) Appl. No.: 17/556,234

(22) Filed: Dec. 20, 2021

(65) Prior Publication Data
US 2023/0194129 A1 Jun. 22, 2023

(51) Int. Cl.
*F25B 41/20* (2021.01)
*F25B 5/02* (2006.01)

(52) U.S. Cl.
CPC .............. *F25B 5/02* (2013.01); *F25B 41/20* (2021.01)

(58) Field of Classification Search
CPC ........ F25B 5/02; F25B 41/20; F25B 2400/16; F25B 2400/161; F25B 2600/2523; F25B 43/006; F25B 2313/001
See application file for complete search history.

(56) References Cited

U.S. PATENT DOCUMENTS

| | | | |
|---|---|---|---|
| 6,523,365 B2 | 2/2003 | Zhang et al. | |
| 6,920,922 B2 | 7/2005 | Takeuchi | |
| 8,113,695 B2 | 2/2012 | Meinke et al. | |
| 8,627,586 B2 | 1/2014 | Bozio et al. | |
| 9,612,041 B2 | 4/2017 | Kawakami et al. | |
| 9,786,964 B2 | 10/2017 | Takeuchi et al. | |
| 10,391,835 B2 | 8/2019 | Blatchley et al. | |
| 10,465,952 B2 | 11/2019 | He et al. | |
| 10,562,446 B2 | 2/2020 | Cannon | |
| 10,737,552 B2 | 8/2020 | He et al. | |
| 2012/0017637 A1 | 1/2012 | Nakajo et al. | |
| 2012/0280528 A1 | 11/2012 | Dellock et al. | |
| 2014/0053597 A1* | 2/2014 | Matsuura | F25B 1/00 62/510 |
| 2015/0274066 A1 | 10/2015 | Del Pozo Gonzalez et al. | |
| 2017/0227258 A1* | 8/2017 | Kawano | F25B 43/00 |
| 2019/0061646 A1 | 2/2019 | Huttenlocher | |
| 2019/0086130 A1* | 3/2019 | Hellmann | F25B 5/02 |
| 2020/0290429 A1 | 9/2020 | Blatchley et al. | |

FOREIGN PATENT DOCUMENTS

EP 3053778 B1 10/2019

* cited by examiner

*Primary Examiner* — Miguel A Diaz
(74) *Attorney, Agent, or Firm* — Vichit Chea; Price Heneveld LLP

(57) ABSTRACT

A heat pump includes a refrigerant loop. The refrigerant loop includes a compressor, a first vapor generator, a second vapor generator, and a third vapor generator. The compressor includes a low-pressure inlet, a mid-pressure inlet, and an outlet. The first vapor generator, the second vapor generator, and the third vapor generator are each positioned downstream of the outlet of the compressor. The first vapor generator, the second vapor generator, and the third vapor generator are each positioned upstream of the mid-pressure inlet of the compressor.

17 Claims, 14 Drawing Sheets

HEAT PUMP WITH MULTIPLE VAPOR GENERATORS

FIELD OF THE DISCLOSURE

The present disclosure generally relates to heat pumps. More specifically, the present disclosure relates to a heat pump with multiple vapor generators.

BACKGROUND OF THE INVENTION

Heat pumps have been employed in vehicles. A refrigerant loop can be included in such heat pumps.

SUMMARY OF THE INVENTION

According to a first aspect of the present invention, a heat pump includes a refrigerant loop. The refrigerant loop includes a compressor, a first vapor generator, a second vapor generator, and a third vapor generator. The compressor includes a low-pressure inlet, a mid-pressure inlet, and an outlet. The first vapor generator, the second vapor generator, and the third vapor generator are each positioned downstream of the outlet of the compressor. The first vapor generator, the second vapor generator, and the third vapor generator are each positioned upstream of the mid-pressure inlet of the compressor.

Embodiments of the first aspect of the invention can include any one or a combination of the following features:
- the refrigerant loop further includes a first heat exchanger positioned downstream of the first vapor generator, a second heat exchanger positioned downstream of the second vapor generator, and a third heat exchanger positioned downstream of the third vapor generator;
- the refrigerant loop further includes a first expansion valve positioned immediately upstream of the first vapor generator, a second expansion valve positioned immediately upstream of the second vapor generator, and a third expansion valve positioned immediately upstream of the third vapor generator;
- the refrigerant loop further includes a first check valve positioned immediately downstream of the second heat exchanger and a second check valve positioned immediately downstream of the third heat exchanger;
- the refrigerant loop further includes a first region of a fourth heat exchanger;
- the refrigerant loop further includes a first shutoff valve positioned immediately downstream of an outlet of the first heat exchanger, a second shutoff valve positioned immediately downstream of the first shutoff valve, and a third shutoff valve positioned immediately downstream of the second shutoff valve;
- the refrigerant loop further includes a fourth shutoff valve positioned immediately downstream of the outlet of the first heat exchanger and a fifth shutoff valve positioned immediately downstream of the outlet of the first heat exchanger;
- a coolant loop that includes a pump, a second region of the fourth heat exchanger, a reservoir, a fifth heat exchanger, and a coolant network of conduits that fluidly couples components of the coolant loop;
- a first heat-producing component positioned downstream of the reservoir and upstream of the fifth heat exchanger;
- a second heat-producing component plumbed in parallel with the fifth heat exchanger;
- the second heat-producing component is in direct fluid communication with the third heat exchanger; and
- the refrigerant loop further includes an accumulator having an inlet and an outlet, wherein the outlet of the accumulator is immediately upstream of the low-pressure inlet of the compressor.

According to a second aspect of the present disclosure, a heat pump includes a refrigerant loop. The refrigerant loop includes a compressor, a first vapor generator, a second vapor generator, a third vapor generator, a first heat exchanger, a second heat exchanger, and a third heat exchanger. The compressor includes a low-pressure inlet, a mid-pressure inlet, and an outlet. The first heat exchanger is positioned downstream of the first vapor generator. The second heat exchanger is positioned downstream of the second vapor generator. The third heat exchanger is positioned downstream of the third vapor generator. The first vapor generator, the second vapor generator, and the third vapor generator are each positioned downstream of the outlet of the compressor. The first vapor generator, the second vapor generator, and the third vapor generator are each positioned upstream of the mid-pressure inlet of the compressor.

Embodiments of the second aspect of the present disclosure can include any one or a combination of the following features:
- the refrigerant loop further includes a first expansion valve positioned immediately upstream of the first vapor generator, a second expansion valve positioned immediately upstream of the second vapor generator, and a third expansion valve positioned immediately upstream of the third vapor generator;
- the refrigerant loop further includes a first check valve positioned immediately downstream of the second heat exchanger and a second check valve positioned immediately downstream of the third heat exchanger;
- the refrigerant loop further includes a first region of a fourth heat exchanger;
- the refrigerant loop further includes a first shutoff valve positioned immediately downstream of an outlet of the first heat exchanger, a second shutoff valve positioned immediately downstream of the first shutoff valve, a third shutoff valve positioned immediately downstream of the second shutoff valve, a fourth shutoff valve positioned immediately downstream of the outlet of the first heat exchanger, and a fifth shutoff valve positioned immediately downstream of the outlet of the first heat exchanger;
- a coolant loop that includes a pump, a second region of the fourth heat exchanger, a reservoir, a fifth heat exchanger, and a coolant network of conduits that fluidly couples components of the coolant loop;
- a first heat-producing component positioned downstream of the reservoir and upstream of the fifth heat exchanger and a second heat-producing component plumbed in parallel with the fifth heat exchanger, wherein the second heat-producing component is in direct fluid communication with the third heat exchanger; and
- the refrigerant loop further includes an accumulator having an inlet and an outlet, wherein the outlet of the accumulator is immediately upstream of the low-pressure inlet of the compressor.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

Figure 1:
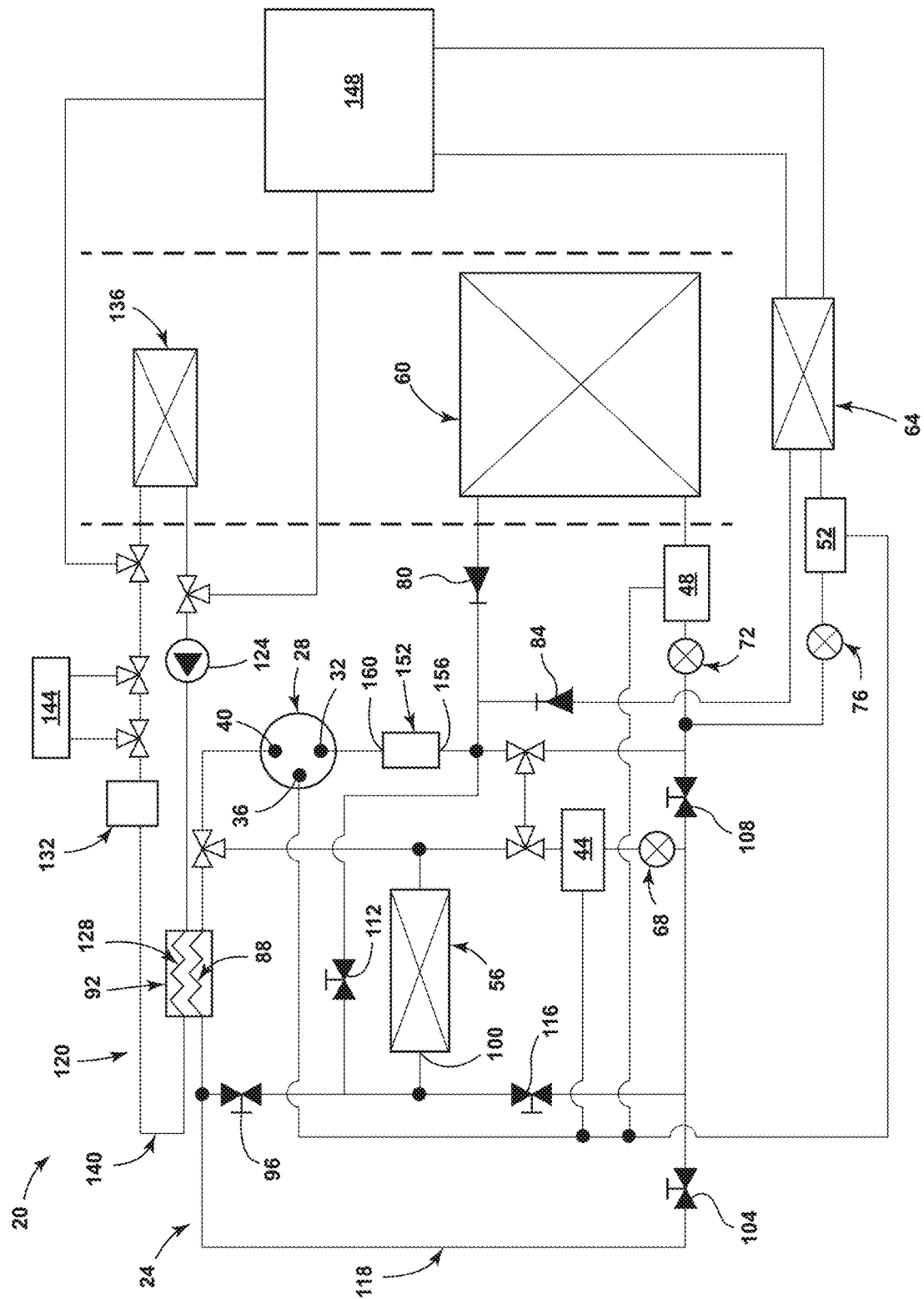
FIG. 1 is a schematic representation of a heat pump arrangement, illustrating a refrigerant loop and a coolant loop, according to one example.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a heat pump. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring to FIGS. 1-14, a heat pump 20 includes a refrigerant loop 24. The refrigerant loop 24 includes a compressor 28. The compressor 28 includes a low-pressure inlet 32, a mid-pressure inlet 36, and an outlet 40. The refrigerant loop 24 also includes a first vapor generator 44, a second vapor generator 48, and a third vapor generator 52. The first vapor generator 44, the second vapor generator 48, and the third vapor generator 52 are each positioned downstream of the outlet 40 of the compressor 28. The first vapor generator 44, the second vapor generator 48, and the third vapor generator 52 are each positioned upstream of the mid-pressure inlet 36 of the compressor 28. In some examples, the first vapor generator 44, the second vapor generator 48, and/or the third vapor generator 52 may be a liquid-gas separator valve. In such examples, those of the vapor generators that are liquid-gas separator valves may perform a thermal phase separation and/or a mechanical phase separation, whereby a gaseous component of the first heat exchange fluid that is circulating through the refrigerant loop 24 is extracted, at least in part. The portion of the gaseous component of the first heat exchange fluid extracted by the liquid-gas separator valve may then be injected into the compressor 28 at the mid-pressure inlet 36, as will be discussed in further detail herein. Additionally, in such examples, the remainder of the first heat exchange fluid, which may contain liquid and/or gas components, is circulated through the refrigerant loop 24 to remaining components of the refrigerant loop 24 for a given mode of operation. This remaining portion of the first heat exchange fluid eventually is directed to the low-pressure inlet 32 of the compressor 28. In alternative examples, the first vapor generator 44, the second vapor generator 48, and/or the third vapor generator 52 may be a plate-style heat exchanger. In such examples, those vapor generators that are plate-style heat exchangers can include a first region and a second region. The first region may receive a first portion of the first heat exchange fluid and the second region of the plate-style heat exchanger version of the vapor generators can receive a second portion of the first heat exchange fluid. The first and second portions of the first heat exchange fluid thermally interact with one another to generate vapor or gas for injection into the mid-pressure inlet 36.

Referring again to FIGS. 1-14, a first heat exchanger 56 can be positioned downstream of the first vapor generator 44. For example, the first heat exchanger 56 may be positioned immediately downstream of the first vapor generator 44. A second heat exchanger 60 can be positioned downstream of the second vapor generator 48. For example, the second heat exchanger 60 may be positioned immediately downstream of the second vapor generator 48. A third heat exchanger 64 can be positioned downstream of the third vapor generator 52. For example, the third heat exchanger 64 may be positioned immediately downstream of the third vapor generator 52. Accordingly, in some examples, each of the first heat exchanger 56, the second heat exchanger 60, and third heat exchanger 64 can have a separate vapor generator associated therewith, such as the first vapor generator 44, the second vapor generator 48, and the third vapor generator 52, respectively. A first expansion valve 68 is positioned upstream of the first vapor generator 44. For example, the first expansion valve 68 may be positioned immediately upstream of the first vapor generator 44. A second expansion valve 72 is positioned upstream of the second vapor generator 48. For example, the second expansion valve 72 may be positioned immediately upstream of the second vapor generator 48. A third expansion valve 76 is positioned upstream of the third vapor generator 52. For example, the third expansion valve 76 may be positioned immediately upstream of the third vapor generator 52. In various examples, the first expansion valve 68, the second expansion valve 72, and/or the third expansion valve 76 may be capable of operating as a shutoff valve. Accordingly, the first expansion valve 68, the second expansion valve 72, and/or the third expansion valve 76 may be employed in controlling flow of the first heat exchange fluid.

Referring further to FIGS. 1-14, a first check valve 80 is positioned immediately downstream of the second heat exchanger 60. A second check valve 84 is positioned immediately downstream of the third heat exchanger 64. The refrigerant loop 24 includes a first region 88 of a fourth heat exchanger 92. A first shutoff valve 96 is positioned immediately downstream of an outlet 100 of the first heat exchanger 56. A second shutoff valve 104 is positioned immediately downstream of the first shutoff valve 96. The second shutoff valve 104 is also immediately downstream of the first region 88 of the fourth heat exchanger 92. A third shutoff valve 108 is positioned immediately downstream of the second shutoff valve 104. A fourth shutoff valve 112 is positioned immediately downstream of the outlet 100 of the first heat exchanger 56. A fifth shutoff valve 116 is positioned immediately downstream of the outlet 100 of the first heat exchanger 56. A refrigerant network of conduits 118 fluidly couples components of the refrigerant loop 24 with one another. A first heat exchange fluid (e.g., a refrigerant) flows through the refrigerant network of conduits 118 and the components of the refrigerant loop 24.

Referring still further to FIGS. 1-14, the heat pump 20 includes a coolant loop 120. The coolant loop 120 includes a pump 124, a second region 128 of the fourth heat exchanger 92, a reservoir 132, a fifth heat exchanger 136, and a coolant network of conduits 140. A second heat exchange fluid (e.g., a coolant) flows through the coolant network of conduits 140 and the components of the coolant loop 120. The second region 128 of the fourth heat exchanger 92 is immediately downstream of the pump 124. The reservoir 132 is immediately downstream of the second region 128 of the fourth heat exchanger 92. The fifth heat exchanger 136 is downstream of the reservoir 132. A first heat-producing component 144 is positioned downstream of the reservoir 132. The first heat-producing component 144 is positioned upstream of the fifth heat exchanger 136. A second heat-producing component 148 is plumbed in parallel with the fifth heat exchanger 136. Accordingly, the second heat-producing component 148 is downstream of the reservoir 132 and/or the first heat-producing component 144. The second heat-producing component 148 is in direct fluid communication with the third heat exchanger 64. Accordingly, the third heat exchanger 64 may exchange heat between the first heat exchange fluid and the second heat exchange fluid. An accumulator 152 is positioned upstream of the compressor 28. The accumulator 152 includes an inlet 156 and an outlet 160. The outlet 160 of the accumulator 152 is immediately upstream of the low-pressure inlet 32 of the compressor 28.

Referring now to FIGS. 2-4, 8-9, and 12-14, a cabin cooling mode of operation (FIG. 2), a cabin and battery cooling mode of operation (FIG. 3), a battery cooling mode of operation (FIG. 4), a first reheat mode of operation (FIG. 8), a second reheat mode of operation (FIG. 9), a deice mode of operation (FIG. 12), a first deice and heat mode of operation (FIG. 13), and a second deice and heat mode of operation (FIG. 14) are each depicted in exemplary form. A first three-way valve 164 is positioned downstream of the outlet 40 of the compressor 28. The first three-way valve 164 is positioned upstream of an inlet 168 of the first heat exchanger 56. The first three-way valve 164 is also upstream of the first region 88 of the fourth heat exchanger 92. In each of these modes of operation, the compressor 28 acts upon the first heat exchange fluid to drive the first heat exchange fluid from the outlet 40 toward the first three-way valve 164. More specifically, the compressor 28 drives the first heat exchange fluid toward a first port 172 of the first three-way valve 164. As a result of the positioning of the first three-way valve 164 in these modes of operation, the first heat exchange fluid that is received at the first port 172 is directed to exit the first three-way valve 164 at a second port 176 thereof. In the modes of operation depicted in FIGS. 8 and 9, the positioning of the first three-way valve 164 also permits the first heat exchange fluid to exit the first three-way valve 164 by way of a third port 178 thereof, as will be discussed in further detail herein. After exiting the second port 176 of the first three-way valve 164, the first heat exchange fluid is directed toward the inlet 168 of the first heat exchanger 56. As the first heat exchange fluid flows through the first heat exchanger 56, the first heat exchange fluid may thermally interact with a heat exchange fluid that is external to the refrigerant loop 24 and the coolant loop 120 (e.g., ambient air) such that heat may be removed from the first heat exchange fluid. Alternatively, at the first heat exchanger 56, the first heat exchange fluid may absorb heat from the heat exchange fluid that is external to the refrigerant loop 24 and the coolant loop 120. The flow of heat to or from the first heat exchange fluid at the first heat exchanger 56 depends upon the particular mode of operation and the thermal conditions of the heat exchange fluid that is external to the refrigerant loop 24 and the coolant loop 120. The first heat exchange fluid exits the first heat exchanger 56 at the outlet 100 of the first heat exchanger 56.

Figure 2:
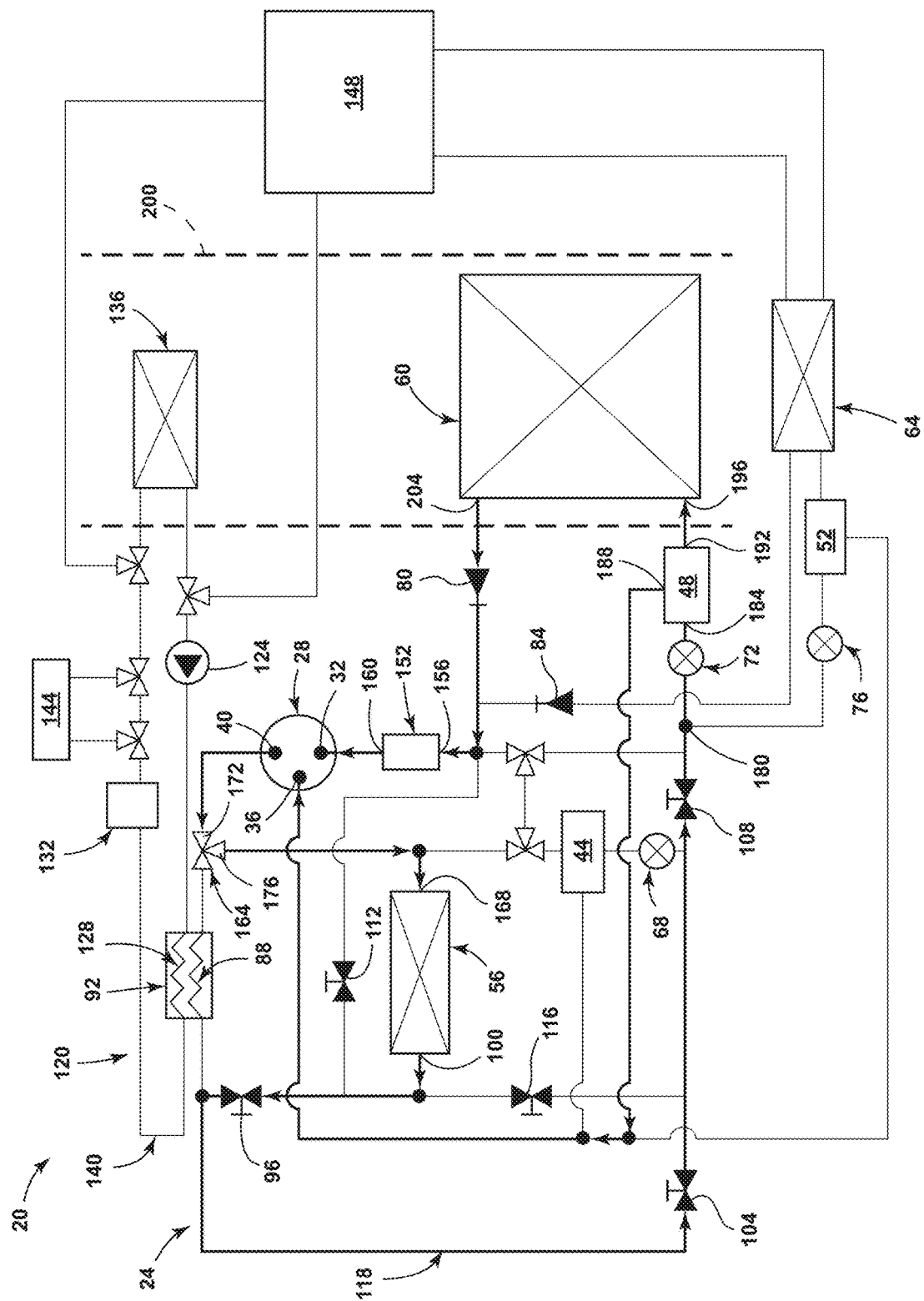
FIG. 2 is a schematic representation of the heat pump arrangement, illustrating a cabin cooling mode of operation, according to one example.
Figure 3:
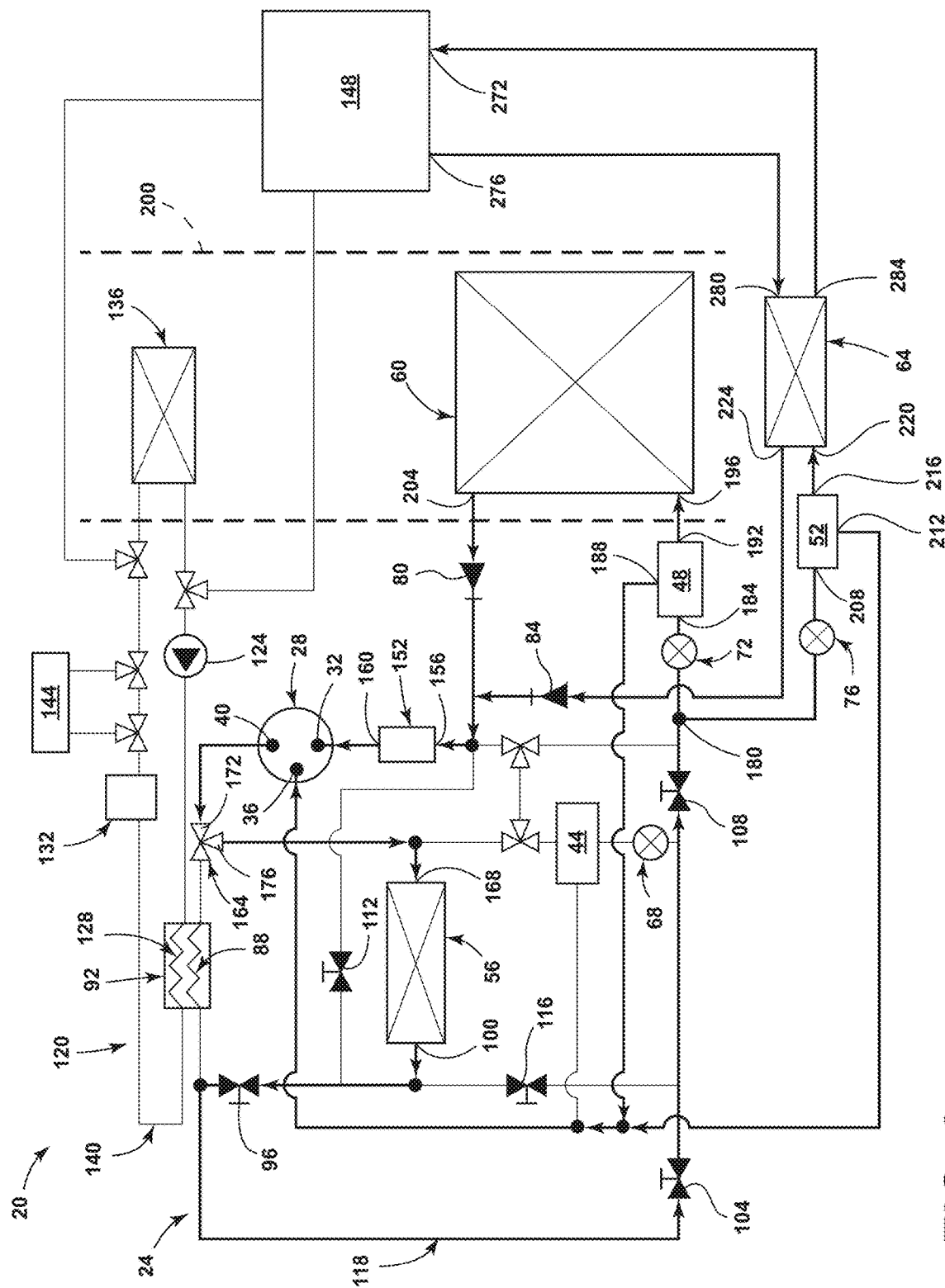
FIG. 3 is a schematic representation of the heat pump arrangement, illustrating a cabin and battery cooling mode of operation, according to one example.
Figure 4:
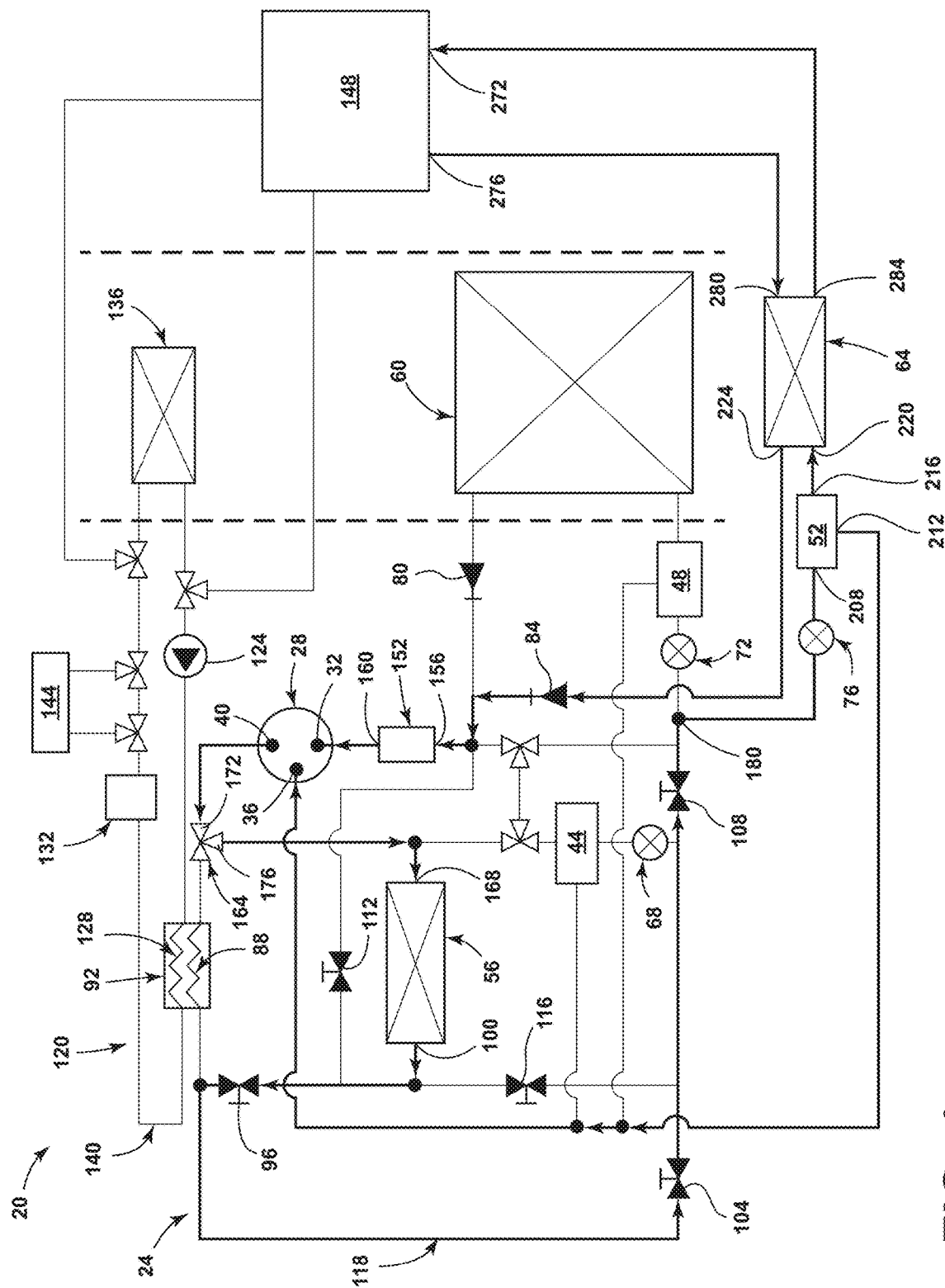
FIG. 4 is a schematic representation of the heat pump arrangement, illustrating a battery cooling mode of operation, according to one example.

Referring further to FIGS. 2-4, in these modes of operation, the fourth shutoff valve 112 and the fifth shutoff valve 116 are each in a closed position. The first shutoff valve 96 is in an open position in these modes of operation. Accordingly, the first heat exchange fluid that exits the first heat exchanger 56 by way of the outlet 100 thereof of is directed to the first shutoff valve 96. After flowing through the first shutoff valve 96, the first heat exchange fluid is directed toward the second shutoff valve 104 by the refrigerant network of conduits 118. The second shutoff valve 104 is in an open position and the first heat exchange fluid flows through the second shutoff valve 104. In various examples, the first expansion valve 68 may be capable of operating as a shutoff valve such that flow of the first heat exchange fluid through the first expansion valve 68 may be prevented. In the depicted modes of operation, the third shutoff valve 108 is in an open position. Therefore, the first heat exchange fluid that passes through the second shutoff valve 104 is directed to, and flows through, the third shutoff valve 108.

With specific reference to FIGS. 2 and 3, after exiting the third shutoff valve 108, the first heat exchange fluid encounters a branching point 180. At the branching point 180, the refrigerant network of conduits 118 splits into a first path and a second path, with the first path leading toward the second heat exchanger 60 and the second path leading toward the third heat exchanger 64. For the time being, focus is directed toward the first path that leads toward the second heat exchanger 60. From the branching point 180, at least a portion of the first heat exchange fluid is directed to the second expansion valve 72. The first heat exchange fluid decreases in pressure and temperature as a result of interaction with the second expansion valve 72. From the second expansion valve 72, the first heat exchange fluid is directed to the second vapor generator 48. The first heat exchange fluid is received at an inlet 184 of the second vapor generator 48. At the second vapor generator 48, at least a portion of a gaseous component of the first heat exchange fluid is directed to the mid-pressure inlet 36 of the compressor 28. More specifically, the at least a portion of the gaseous component of the first heat exchange fluid can exit the second vapor generator 48 by way of a first outlet 188 and be directed to the mid-pressure inlet 36 by the refrigerant network of conduits 118. For example, the at least a portion of the gaseous component of the first heat exchange fluid may be removed from the first heat exchange fluid in a liquid-gas separator valve or the at least a portion of the gaseous component of the first heat exchange fluid may be removed/generated by a plate-style heat exchanger version of the second vapor generator 48. As used herein, when discussing the generation of vapor at a given one of the vapor generators for plate-style heat exchanger versions of the vapor generator(s), such generation may be accomplished by inducing an increase in temperature of the portion of the first heat exchange fluid that is to-be directed toward the mid-pressure inlet 36 of the compressor 28. Accordingly, the vapor is "generated" by adjusting a thermal equilibrium of the first heat exchange fluid as a result of interaction with the given one of the vapor generators such that a vapor, or gaseous, percentage of the first heat exchange fluid is increased for the portion of the first heat exchange fluid that is directed to the mid-pressure inlet 36 of the compressor 28.

Referring again to FIGS. 2 and 3, the remaining portion of the first heat exchange fluid that was not directed toward the mid-pressure inlet 36 of the compressor 28 may exit the second vapor generator 48 by way of a second outlet 192. From the second outlet 192 of the second vapor generator 48, the first heat exchange fluid is directed to an inlet 196 of the second heat exchanger 60. The decreased temperature and pressure of the first heat exchange fluid that was provided by the second expansion valve 72 may be maintained, at least in part, after interaction with the second vapor generator 48. Accordingly, the thermal properties of the first heat exchange fluid flowing through the second heat exchanger 60 can be employed to provide cooling to air that is flowing through ductwork 200 with which the second heat exchanger 60 is in fluid communication. Therefore, the first heat exchange fluid that exits the second heat exchanger 60 by way of an outlet 204 of the second heat exchanger 60 may have an increased pressure, temperature, and/or vapor percentage than the first heat exchange fluid that entered the second heat exchanger 60 at the inlet 196. In various examples, the second heat exchanger 60 may be positioned within the ductwork 200 (e.g., physically within a volume defined by the ductwork 200). Upon exiting the second heat exchanger 60 by way of the outlet 204, the first heat exchange fluid flows through the first check valve 80. After exiting the first check valve 80, the first heat exchange fluid is directed toward the accumulator 152 by the refrigerant network of conduits 118. In the mode of operation depicted in FIG. 2, the second check valve 84 prevents back flow toward the third heat exchanger 64. Accordingly, the third heat exchanger 64 is prevented from becoming a storage vessel for the first heat exchange fluid when the third heat exchanger 64 is not employed in a given mode of operation. The accumulator 152 receives the first heat exchange fluid and provides a gaseous component of the first heat exchange fluid to the low-pressure inlet 32 of the compressor 28, thereby completing the traversal of the refrigerant loop 24. In the mode of operation depicted in FIG. 3, the first heat exchange fluid also flowed along the second path toward the third heat exchanger 64 at the branching point 180. The first heat exchange fluid from the second path is rejoined, or recombined, with the first heat exchange fluid from the first path prior to flowing to the accumulator 152, as will be discussed further herein.

Referring particularly to FIGS. 3 and 4, after exiting the third shutoff valve 108, the first heat exchange fluid encounters the branching point 180. At the branching point 180, the refrigerant network of conduits 118 splits into the first path and the second path, with the first path leading toward the second heat exchanger 60 and the second path leading toward the third heat exchanger 64. In the mode of operation depicted in FIG. 3, the first heat exchange fluid is split into a first portion that follows the first path in the manner described above and a second portion that follows the second path, as will be described below. In the mode of operation depicted in FIG. 4, an entirety of the first heat exchange fluid that encounters the branching point 180 is directed along the second path toward the third heat exchanger 64. From the branching point 180, at least a portion of the first heat exchange fluid is directed toward the third heat exchanger 64. Prior to reaching the third heat exchanger 64, the first heat exchange fluid first encounters the third expansion valve 76. The first heat exchange fluid decreases in pressure and temperature as a result of interaction with the third expansion valve 76. From the third expansion valve 76, the first heat exchange fluid is directed to the third vapor generator 52. The first heat exchange fluid is received at an inlet 208 of the third vapor generator 52. At the third vapor generator 52, at least a portion of a gaseous component of the first heat exchange fluid is directed to the mid-pressure inlet 36 of the compressor 28. More specifically, the at least a portion of the gaseous component of the first heat exchange fluid can exit the third vapor generator 52 by way of a first outlet 212 and be directed to the mid-pressure inlet 36 by the refrigerant network of conduits 118.

Referring again to FIGS. 3 and 4, the remaining portion of the first heat exchange fluid that was not directed toward the mid-pressure inlet 36 of the compressor 28 may exit the third vapor generator 52 by way of a second outlet 216. From the second outlet 216 of the third vapor generator 52, the first heat exchange fluid is directed to a first inlet 220 of the third heat exchanger 64. The decreased temperature and pressure of the first heat exchange fluid that was provided by the third expansion valve 76 may be maintained, at least in part, after interaction with the third vapor generator 52. Accordingly, the thermal properties of the first heat exchange fluid flowing through the third heat exchanger 64 can be employed to provide cooling to a second heat exchange fluid that is also flowing through the third heat exchanger 64, as will be discussed further herein. Therefore, the first heat exchange fluid that exits the third heat exchanger 64 by way of a first outlet 224 of the third heat exchanger 64 may have an increased pressure, temperature, and/or vapor percentage when compared to the first heat exchange fluid that entered the third heat exchanger 64 at the first inlet 220. From the first outlet 224 of the third heat exchanger 64, the first heat exchange fluid is directed to the second check valve 84 by the refrigerant network of conduits 118. The first heat exchange fluid flows through the second check valve 84 and is directed to the accumulator 152. In the mode of operation depicted in FIG. 3, after exiting the second check valve 84, the second portion of the first heat exchange fluid is rejoined, or recombined, with the first portion of the first heat exchange fluid prior to reaching the accumulator 152. In the mode of operation depicted in FIG. 4, the first check valve 80 prevents back flow toward the second heat exchanger 60. Accordingly, the second heat exchanger 60 is prevented from becoming a storage vessel for the first heat exchange fluid when the second heat exchanger 60 is not employed in a given mode of operation. The accumulator 152 receives the first heat exchange fluid and performs as described above, thereby completing the traversal of the refrigerant loop 24.

Figure 5:
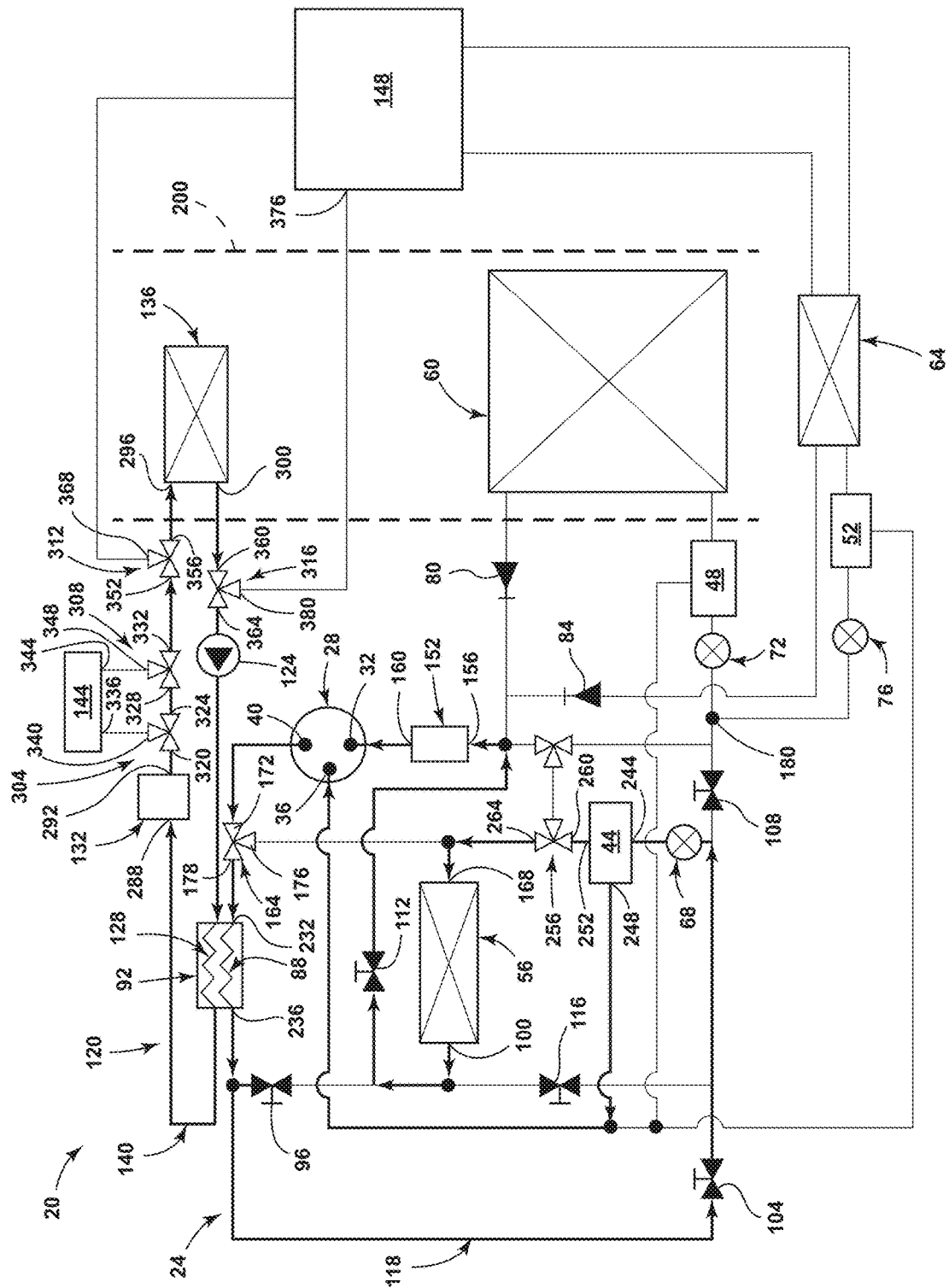
FIG. 5 is a schematic representation of the heat pump arrangement, illustrating a cabin heating mode of operation, according to one example.
Figure 6:
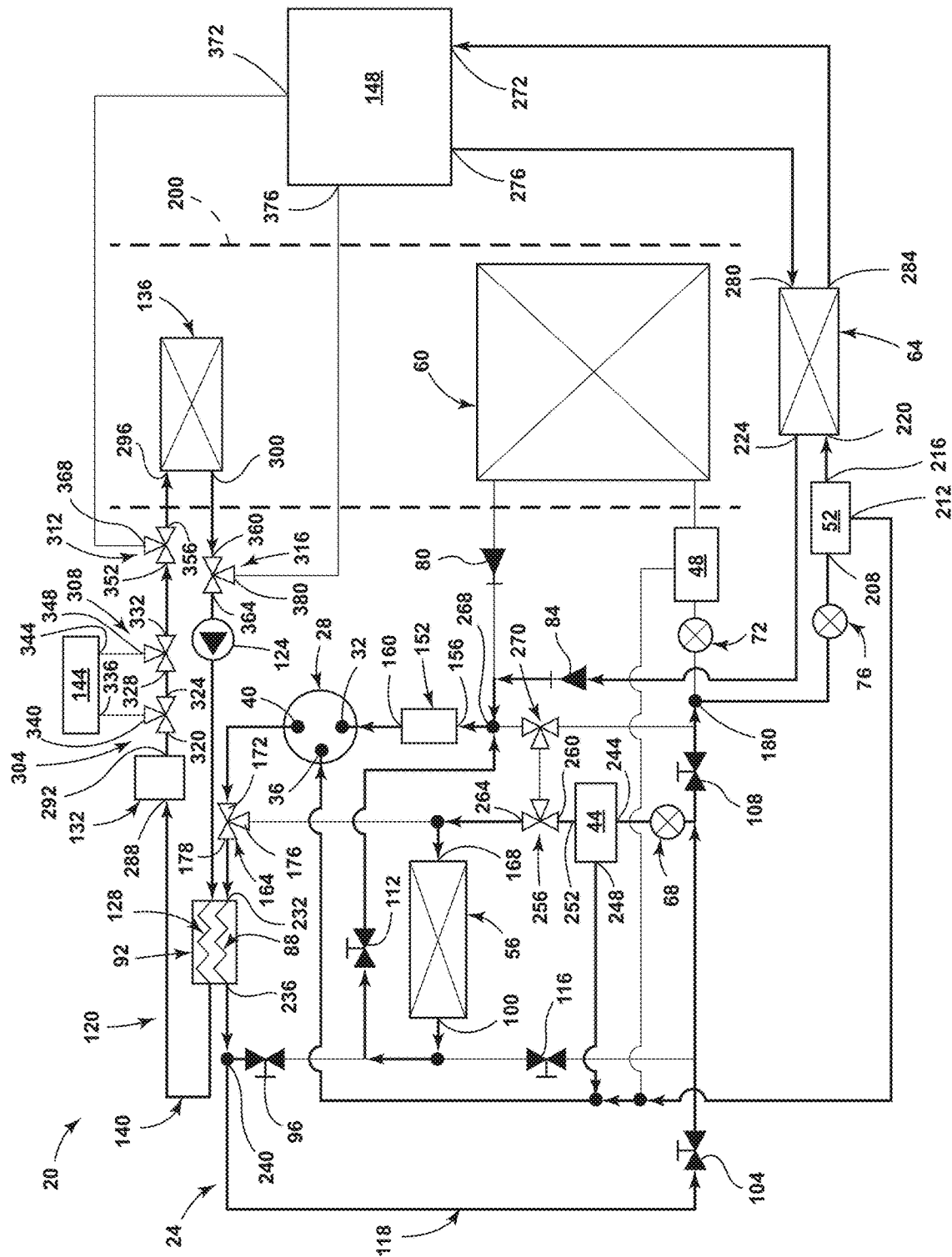
FIG. 6 is a schematic representation of the heat pump arrangement, illustrating a cabin heating and battery cooling mode of operation, according to one example.
Figure 7:
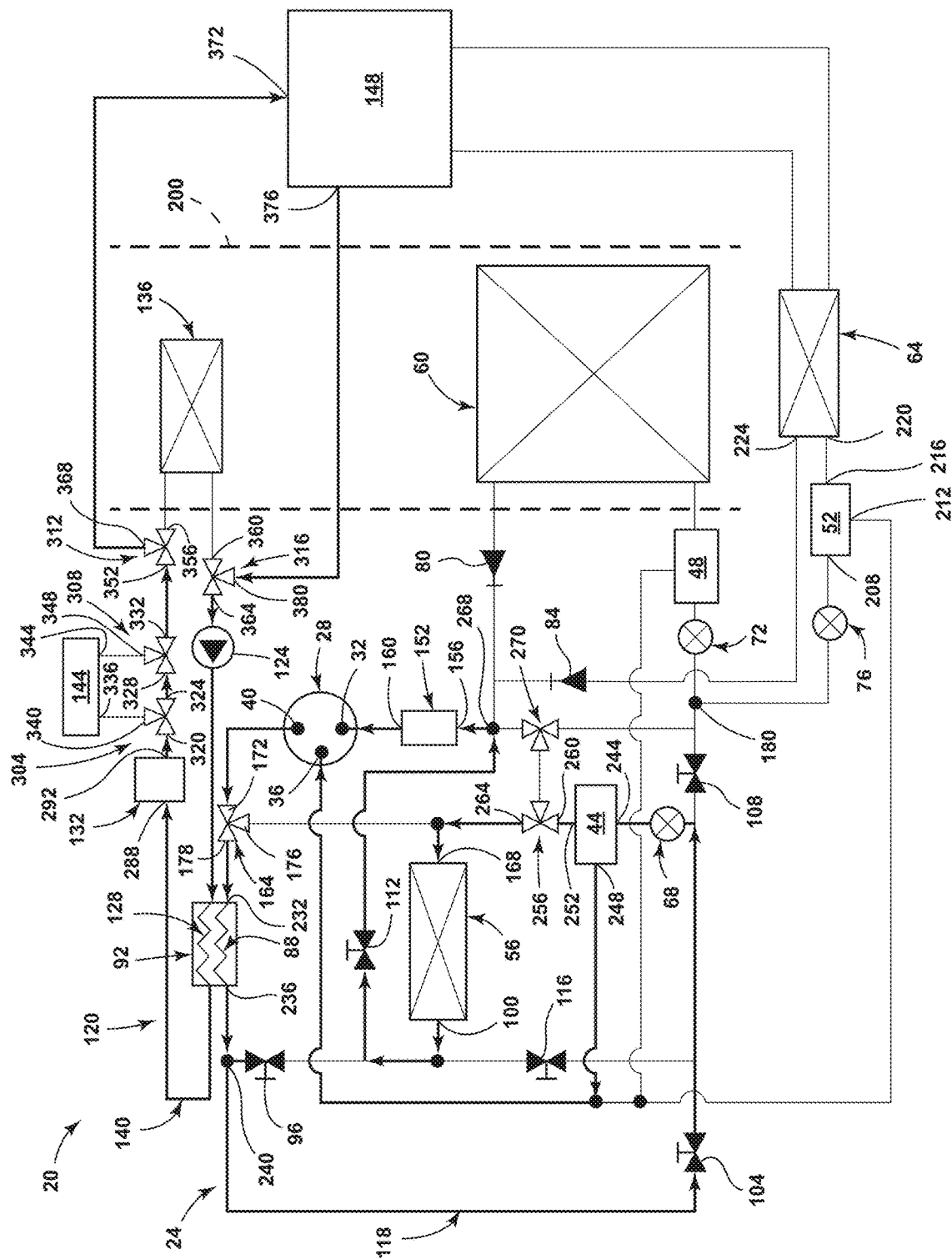
FIG. 7 is a schematic representation of the heat pump arrangement, illustrating a battery heating mode of operation, according to one example.

Referring now to FIGS. 5-7, a cabin heating mode of operation (FIG. 5), a cabin heating and battery cooling mode of operation (FIG. 6), and a battery heating mode of operation (FIG. 7) are each depicted in exemplary form. In each of these modes of operation, the compressor 28 acts upon the first heat exchange fluid to drive the first heat exchange fluid from the outlet 40 toward the first three-way valve 164. More specifically, the compressor 28 drives the first heat exchange fluid toward the first port 172 of the first three-way valve 164. As a result of the positioning of the first three-way valve 164 in these modes of operation, the first heat exchange fluid that is received at the first port 172 is directed to exit the first three-way valve 164 at the third port 178 thereof. After exiting the third port 178 of the first three-way valve 164, the first heat exchange fluid is directed toward an inlet 232 of the first region 88 of the fourth heat exchanger 92. Within the fourth heat exchanger 92, the first heat exchange fluid thermally interacts with the second heat exchange fluid that is flowing through the coolant loop 120 by way of the second region 128 of the fourth heat exchanger 92. The first heat exchange fluid exits the first region 88 of the fourth heat exchanger 92 by way of an outlet 236 thereof. From the outlet 236 of the first region 88 of the fourth heat exchanger 92, the first heat exchange fluid is directed toward a first coupling point 240. The first coupling point 240 is downstream of the first shutoff valve 96. The first shutoff valve 96 is in the closed position in each of these modes of operation. Accordingly, the first heat exchange fluid passes through the first coupling point 240 and is directed toward the second shutoff valve 104.

Referring again to FIGS. 5-7, the second shutoff valve 104 and the fourth shutoff valve 112 are each in the open position. In the modes of operation depicted in FIGS. 5 and 7, the third shutoff valve 108 and the fifth shutoff valve 116 are each in the closed position. In the mode of operation depicted in FIG. 6, the third shutoff valve 108 is in the open position and the fifth shutoff valve 116 is in the closed position. Accordingly, the first heat exchange fluid passes through the second shutoff valve 104 and at least a portion of the first heat exchange fluid is directed toward the first expansion valve 68. The first heat exchange fluid decreases in pressure and temperature as a result of interaction with the first expansion valve 68. From the first expansion valve 68, the first heat exchange fluid is directed to the first vapor generator 44. The first heat exchange fluid is received at an inlet 244 of the first vapor generator 44. At the first vapor generator 44, at least a portion of a gaseous component of the first heat exchange fluid is directed to the mid-pressure inlet 36 of the compressor 28. More specifically, the at least a portion of the gaseous component of the first heat exchange fluid can exit the first vapor generator 44 by way of a first outlet 248 and be directed to the mid-pressure inlet 36 by the refrigerant network of conduits 118. For example, the at least a portion of the gaseous component of the first heat exchange fluid may be removed from the first heat exchange fluid in a liquid-gas separator valve or the at least a portion of the gaseous component of the first heat exchange fluid may be removed/generated by a plate-style heat exchanger version of the second vapor generator 48. As used herein, when discussing the generation of vapor at a given one of the vapor generators for plate-style heat exchanger versions of the vapor generator(s), such generation may be accomplished by inducing an increase in temperature of the portion of the first heat exchange fluid that is to-be directed toward the mid-pressure inlet 36 of the compressor 28. Accordingly, the vapor is "generated" by adjusting a thermal equilibrium of the first heat exchange fluid as a result of interaction with the given one of the vapor generators such that a vapor, or gaseous, percentage of the first heat exchange fluid is increased for the portion of the first heat exchange fluid that is directed to the mid-pressure inlet 36 of the compressor 28.

Referring further to FIGS. 5-7, the remaining portion of the first heat exchange fluid that was not directed toward the mid-pressure inlet 36 of the compressor 28 may exit the first vapor generator 44 by way of a second outlet 252. From the second outlet 252 of the first vapor generator 44, the first heat exchange fluid is directed toward a second three-way valve 256. More specifically, the first heat exchange fluid that exits the second outlet 252 of the first vapor generator 44 is received at a first port 260 of the second three-way valve 256. In each of these modes of operation, as a result of the positioning of the second three-way valve 256, the first heat exchange fluid that is received at the first port 260 of the second three-way valve 256 is directed to exit the second three-way valve 256 by way of a second port 264 thereof. After exiting the second port 264 of the second three-way valve 256, the first heat exchange fluid is directed to the inlet 168 of the first heat exchanger 56. The decreased temperature and pressure of the first heat exchange fluid that was provided by the first expansion valve 68 may be maintained, at least in part, after interaction with the first vapor generator 44. As the first heat exchange fluid flows through the first heat exchanger 56, the first heat exchange fluid may thermally interact with a heat exchange fluid that is external to the refrigerant loop 24 and the coolant loop 120 (e.g., ambient air) such that heat may be removed from the first heat exchange fluid. Alternatively, at the first heat exchanger 56, the first heat exchange fluid may absorb heat from the heat exchange fluid that is external to the refrigerant loop 24 and the coolant loop 120. The flow of heat to or from the first heat exchange fluid at the first heat exchanger 56 depends the temperature of the first heat exchange fluid and the temperature of the heat exchange fluid that is external to the refrigerant loop 24 and the coolant loop 120. For example, the heat exchange fluid that is external to the refrigerant loop 24 and the coolant loop 120 may have a temperature that is greater than the temperature of the first heat exchange fluid. In such an example, the first heat exchange fluid may absorb heat from the heat exchange fluid that is external to the refrigerant loop 24 and the coolant loop 120. Accordingly, a temperature, pressure, and/or vapor percentage of the first heat exchange fluid may be greater at the outlet 100 of the first heat exchanger 56 than it was at the inlet 168. From the outlet 100 of the first heat exchanger 56, the first heat exchange fluid is directed to the fourth shutoff valve 112, which is in the open position. After flowing through the fourth shutoff valve 112, the first heat exchange fluid is directed to the accumulator 152. The accumulator 152 perform as described above.

Referring to FIG. 6, in this modes of operation, the third shutoff valve 108 is in the open position and the first expansion valve 68 is open. Accordingly, the first expansion valve 68 and the third shutoff valve 108 each receive a portion of the first heat exchange fluid that exited the second shutoff valve 104. A first portion of the first heat exchange fluid is received by the first expansion valve 68 and proceeds as described above. A second portion of the first heat exchange fluid passes through the third shutoff valve 108 and encounters the branching point 180. In each of these modes of operation, the second expansion valve 72 operates as a shutoff valve such that the first heat exchange fluid that encounters the branching point 180 is entirely directed toward the third expansion valve 76. The first heat exchange fluid decreases in pressure and temperature as a result of interaction with the third expansion valve 76. From the third expansion valve 76, the first heat exchange fluid is directed to the third vapor generator 52. The first heat exchange fluid is received at the inlet 208 of the third vapor generator 52. At the third vapor generator 52, at least a portion of a gaseous component of the first heat exchange fluid is directed to the mid-pressure inlet 36 of the compressor 28. More specifically, the at least a portion of the gaseous component of the first heat exchange fluid can exit the third vapor generator 52 by way of the first outlet 212 and be directed to the mid-pressure inlet 36 by the refrigerant network of conduits 118.

Referring again to FIG. 6, the remaining portion of the first heat exchange fluid that was not directed toward the mid-pressure inlet 36 of the compressor 28 may exit the third vapor generator 52 by way of the second outlet 216. From the second outlet 216 of the third vapor generator 52, the first heat exchange fluid is directed to the first inlet 220 of the third heat exchanger 64. The decreased temperature and pressure of the first heat exchange fluid that was provided by the third expansion valve 76 may be maintained, at least in part, after interaction with the third vapor generator 52. Accordingly, the thermal properties of the first heat exchange fluid flowing through the third heat exchanger 64 can be employed to provide cooling to a second heat exchange fluid that is also flowing through the third heat exchanger 64. Therefore, the first heat exchange fluid that exits the third heat exchanger 64 by way of the first outlet 224 of the third heat exchanger 64 may have an increased pressure, temperature, and/or vapor percentage when compared to the first heat exchange fluid that entered the third heat exchanger 64 at the first inlet 220. The second heat exchange fluid that is also flowing through the third heat exchanger 64 may be the same second heat exchange fluid that flows through the coolant loop 120. Alternatively, the third heat exchanger 64 may receive the first heat exchange fluid and a third heat exchange fluid, with the third heat exchanger 64 facilitating thermal interaction between the first and third heat exchange fluids. The decreased temperature and pressure of the first heat exchange fluid that is flowing through the third heat exchanger 64 can be employed to decrease the temperature of heat-producing components with which the third heat exchanger 64 interacts (e.g., the second heat-producing component 148, electric motors, batteries, electronics, etc.). Accordingly, the first heat exchange fluid that exits the third heat exchanger 64 by way of the first outlet 224 of the third heat exchanger 64 may have an increased pressure, temperature, and/or vapor percentage when compared to the first heat exchange fluid that entered the third heat exchanger 64 at the first inlet 220.

Referring further to FIG. 6, from the first outlet 224 of the third heat exchanger 64, the first heat exchange fluid is directed to the second check valve 84 by the refrigerant network of conduits 118. The first heat exchange fluid flows through the second check valve 84 and is directed to the accumulator 152. After exiting the second check valve 84, the second portion of the first heat exchange fluid is rejoined, or recombined, with the first portion of the first heat exchange fluid prior to reaching the accumulator 152. For example, the first portion and the second portion of the first heat exchange fluid may be rejoined, or recombined, at a second coupling point 268 that is immediately upstream of the inlet 156 of the accumulator 152. The second coupling point 268 may be downstream of a third three-way valve 270. The first check valve 80 prevents back flow toward the second heat exchanger 60. Accordingly, the second heat exchanger 60 is prevented from becoming a storage vessel for the first heat exchange fluid when the second heat exchanger 60 is not employed in a given mode of operation. The accumulator 152 receives the first heat exchange fluid and performs as described above, thereby completing the traversal of the refrigerant loop 24.

Referring now to FIGS. 3-4 and 6, the second heat exchange fluid, or the third heat exchange fluid, flows between the third heat exchanger 64 and the second heat-producing component 148. More specifically, a first inlet 272 of the second heat-producing component 148 receives the second heat exchange fluid, or third heat exchange fluid, from the third heat exchanger 64. The second heat-producing component 148 can be an engine, electronics, battery, battery pack, one or more heating elements, brakes, or the like. The second, or third, heat exchange fluid received at the first inlet 272 of the second heat-producing component 148 can decrease a temperature of the second heat-producing component 148. More specifically, the decreased temperature, pressure, and/or vapor percentage provided to the first heat exchange fluid flowing through the third heat exchanger 64 as a result of interaction with the third expansion valve 76 can be employed for thermal exchange with the second, or third, heat exchange fluid. Accordingly, the second, or third, heat exchange fluid that exits the third heat exchanger 64 may have a decreased temperature, pressure, and/or vapor percentage when compared to the second, or third, heat exchange fluid that entered the third heat exchanger 64. Therefore, the second, or third, heat exchange fluid that exits the second heat-producing component 148 by way of a first outlet 276 thereof may have a greater pressure, temperature, and/or vapor percentage than the second, or third, heat exchange fluid that was received at the first inlet 272. The second heat-producing component 148 is further plumbed to the coolant loop 120, as will be discussed in further detail herein.

Referring again to FIGS. 3-4 and 6, from the first outlet 276 of the second heat-producing component 148, the second, or third, heat exchange fluid is directed toward a second inlet 280 of the third heat exchanger 64. The first heat exchange fluid received at the first inlet 220 and the second, or third, heat exchange fluid received at the second inlet 280 can thermally interact with one another within the third heat exchanger 64. The second, or third, heat exchange fluid that is received at the second inlet 280 exits the third heat exchanger 64 by way of a second outlet 284 thereof. From the second outlet 284 of the third heat exchanger 64, the second, or third, heat exchange fluid is directed back toward the first inlet 272 of the second heat-producing component 148.

Referring now to FIGS. 5-11, various modes of operation of the heat pump 20 that employ the coolant loop 120 are depicted. The pump 124 is activated in these modes of operation such that the second heat exchange fluid is circulated through the components of the coolant loop 120. The second heat exchange fluid is driven from the pump 124 toward the fourth heat exchanger 92. Accordingly, the second heat exchange fluid thermally interacts with the first heat exchange fluid by way of the fourth heat exchanger 92. More specifically, the second heat exchange fluid is circulated through the second region 128 of the fourth heat exchanger 92 while the first heat exchange fluid is circulated through the first region 88 of the fourth heat exchanger 92. In various examples, the second heat exchange fluid may extract heat from the first heat exchange fluid at the fourth heat exchanger 92. From the fourth heat exchanger 92, the second heat exchange fluid is directed to an inlet 288 of the reservoir 132 by the coolant network of conduits 140. The reservoir 132 can accumulate the second heat exchange fluid. An outlet 292 of the reservoir 132 is plumbed to an inlet 296 of the fifth heat exchanger 136 by the coolant network of conduits 140. In the mode of operation depicted in FIG. 7, the fifth heat exchanger 136 is bypassed and the second heat exchange fluid is instead directed to the second heat-producing component 148, as will be discussed in further detail herein. In various examples, additional components can be included with the coolant loop 120 and plumbed between the outlet 292 of the reservoir 132 and the inlet 296 of the fifth heat exchanger 136, as will be discussed in further detail herein.

Referring to FIGS. 5, 6, and 8-11, an outlet 300 of the fifth heat exchanger 136 is plumbed to the pump 124. Accordingly, as the pump 124 is operated, the second heat exchange fluid is pulled from the reservoir 132 and into the inlet 296 of the fifth heat exchanger 136 in a siphon-like manner. Said another way, operation of the pump 124 may generate a positive pressure at the inlet 288 of the reservoir 132 and a negative pressure at the outlet 292 of the reservoir 132. Therefore, the pressure differential across the reservoir 132 can facilitate the introduction of the second heat exchange fluid into the inlet 296 of the fifth heat exchanger 136. In some examples, additional components can be included with the coolant loop 120 and plumbed between the outlet 300 of the fifth heat exchanger 136 and the pump 124. The second heat exchange fluid can provide heat to a cabin of a vehicle as a result of the fluid communication between the fifth heat exchanger 136 and the ductwork 200. In various examples, the fifth heat exchanger 136 may operate as a heater core. Alternatively, heat from the second heat exchange fluid may be directed to components that can benefit from such heat, such as batteries, electrical components, the first heat-producing component 144, and/or the second heat-producing component 148 during cold weather conditions in the environment within which the vehicle or the heat pump 20 currently occupies at a given time (e.g., see FIG. 7).

Referring again to FIGS. 5-11, in the depicted examples, a fourth three-way valve 304, a fifth three-way valve 308, and a sixth three-way valve 312 are positioned between the outlet 292 of the reservoir 132 and the inlet 296 of the fifth heat exchanger 136. The fourth three-way valve 304 is downstream of the outlet 292 of the reservoir 132 and upstream of the fifth three-way valve 308. The fifth three-way valve 308 is downstream of the fourth three-way valve 304 and upstream of the sixth three-way valve 312. The sixth three-way valve 312 is downstream of the fifth three-way valve 308 and upstream of the inlet 296 of the fifth heat exchanger 136. Additionally, in the depicted examples, a seventh three-way valve 316 is positioned between the outlet 300 of the fifth heat exchanger 136 and the pump 124.

Referring further to FIGS. 5-11, from the outlet 292 of the reservoir 132, the second heat exchange fluid is directed to a first port 320 of the fourth three-way valve 304. In each of these modes of operation, the fourth three-way valve 304 is positioned such that the second heat exchange fluid received at the first port 320 is directed to exit the fourth three-way valve 304 by way of a second port 324 thereof. From the second port 324 of the fourth three-way valve 304, the second heat exchange fluid is directed toward a first port 328 of the fifth three-way valve 308. In each of these modes of operation, the fifth three-way valve 308 is positioned such that the second heat exchange fluid received at the first port 328 is directed to exit the fifth three-way valve 308 by way of a second port 332 thereof. The first heat-producing component 144 is plumbed to the fourth and fifth three-way valves 304, 308 such that the first heat-producing component 144 is in series with the reservoir 132, the fifth heat exchanger 136, and/or the second heat-producing component 148. More specifically, an inlet 336 of the first heat-producing component 144 is plumbed to a third port 340 of the fourth three-way valve 304 and an outlet 344 of the first heat-producing component 144 is plumbed to a third port 348 of the fifth three-way valve 308.

Referring yet again to FIGS. 5-11, when the fourth three-way valve 304 is positioned to utilize the first heat-producing component 144 in a given mode of operation (e.g., FIGS. 13 and 14), the second heat exchange fluid received at the first port 320 is directed to exit the fourth three-way valve 304 by way of the third port 340 thereof. From the third port 340 of the fourth three-way valve 304, the second heat exchange fluid is directed to the inlet 336 of the first heat-producing component 144. The first heat-producing component 144 can be an engine, electronics, battery, battery pack, one or more heating elements, brakes, or the like. After interacting with the first heat-producing component 144, the second heat exchange fluid exits the first heat-producing component 144 by way of the outlet 344 thereof. As a result of interaction with the first heat-producing component 144, the second heat exchange fluid that exits by way of the outlet 344 may have a greater pressure and/or a greater temperature than the second heat exchange fluid that entered by way of the inlet 336. From the outlet 344 of the first heat-producing component 144, the second heat exchange fluid is directed to the third port 348 of the fifth three-way valve 308. Based upon a positioning of the fifth three-way valve 308, the second heat exchange fluid received at the third port 348 is directed to exit the fifth three-way valve 308 by way of the second port 332 thereof. From the second port 332 of the fifth three-way valve 308, the second heat exchange fluid is directed to a first port 352 of the sixth three-way valve 312.

With specific reference to FIGS. 5, 6, and 8-11, in each of these modes of operation, the sixth three-way valve 312 is positioned such that the second heat exchange fluid received at the first port 352 is directed to exit the sixth three-way valve 312 by way of a second port 356 thereof. The second heat exchange fluid that exits the sixth three-way valve 312 by way of the second port 356 thereof is directed to the inlet 296 of the fifth heat exchanger 136. While in the fifth heat exchanger 136, the heat carried by the second heat exchange fluid can be employed in the manner outlined above. The second heat exchange fluid exits the fifth heat exchanger 136 by way of the outlet 300. From the outlet 300, the second heat exchange fluid is directed toward a first port 360 of the seventh three-way valve 316. In each of these modes of operation, the seventh three-way valve 316 is positioned such that the second heat exchange fluid received at the first port 360 is directed to exit the seventh three-way valve 316 by way of a second port 364 thereof. The second heat-producing component 148 is plumbed in parallel with the fifth heat exchanger 136.

Referring particularly to FIG. 7, when the second heat-producing component 148 is utilized in a given mode of operation, the positioning of the sixth three-way valve 312 is such that the second heat exchange fluid received at the first port 352 is directed to exit the sixth three-way valve 312 at a third port 368 thereof. From the third port 368, the second heat exchange fluid is directed to a second inlet 372 of the second heat-producing component 148. The second inlet 372 of the second heat-producing component 148 can be immediately downstream of the third port 368 of the sixth three-way valve 312. The second heat exchange fluid received at the second inlet 372 may provide heat to the second heat-producing component 148 (e.g., during cold weather). The second heat exchange fluid received at the second inlet 372 exits the second heat-producing component 148 by way of a second outlet 376 thereof. The second heat exchange fluid increases in temperature, pressure, and/or vapor percentage as a result of interaction with the second heat-producing component 148. Upon exiting the second outlet 376 of the second heat-producing component 148, the second heat exchange fluid is directed to a third port 380 of the seventh three-way valve 316. At the seventh three-way valve 316, the second heat exchange fluid is directed to exit the seventh three-way valve 316 by way of the second port 364 thereof. From the second port 364 of the seventh three-way valve 316, the second heat exchange fluid is directed toward the pump 124, thereby completing traversal of the coolant loop 120 in such a mode of operation.

Figure 8:
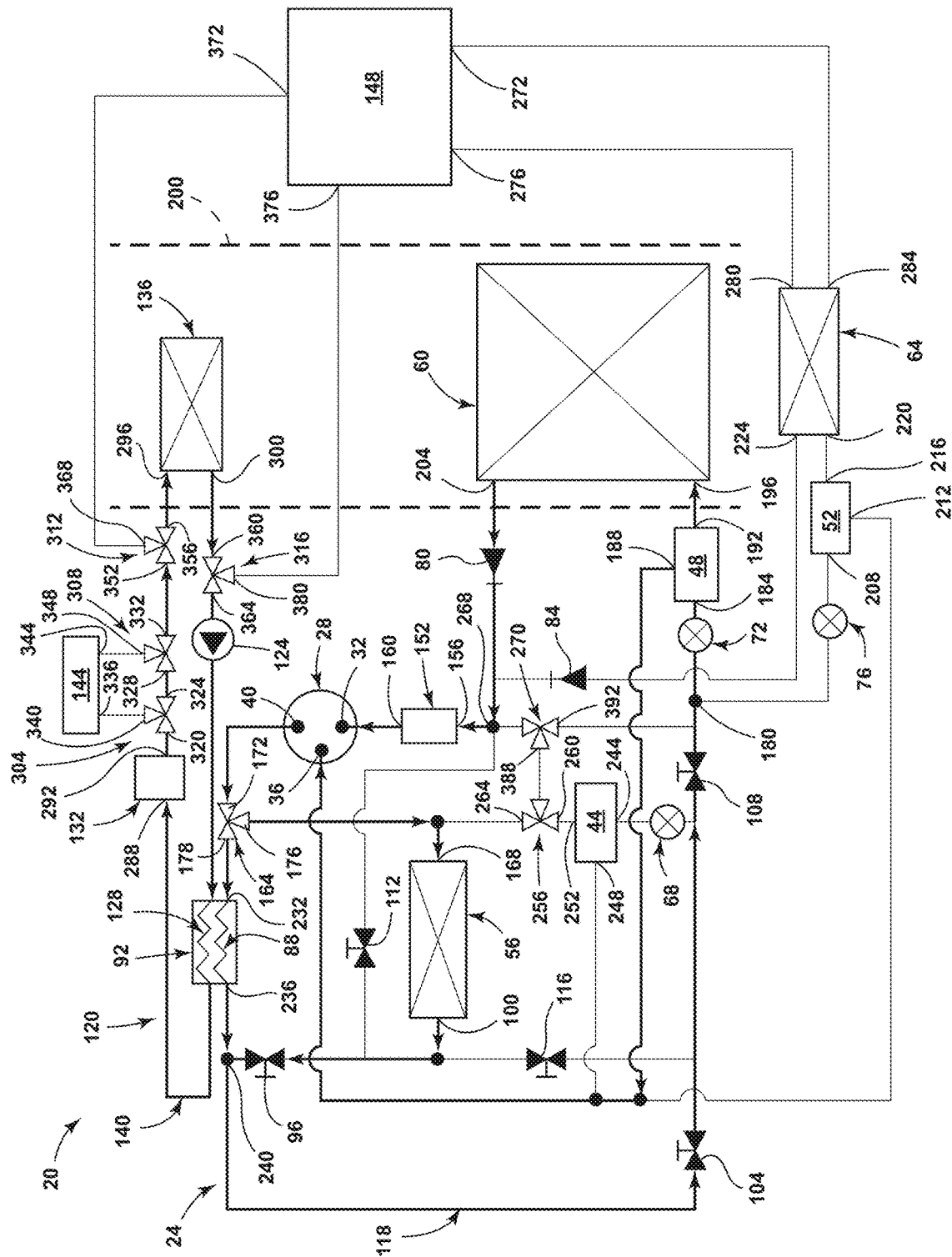
FIG. 8 is a schematic representation of the heat pump arrangement, illustrating a first reheat mode of operation, according to one example.
Figure 9:
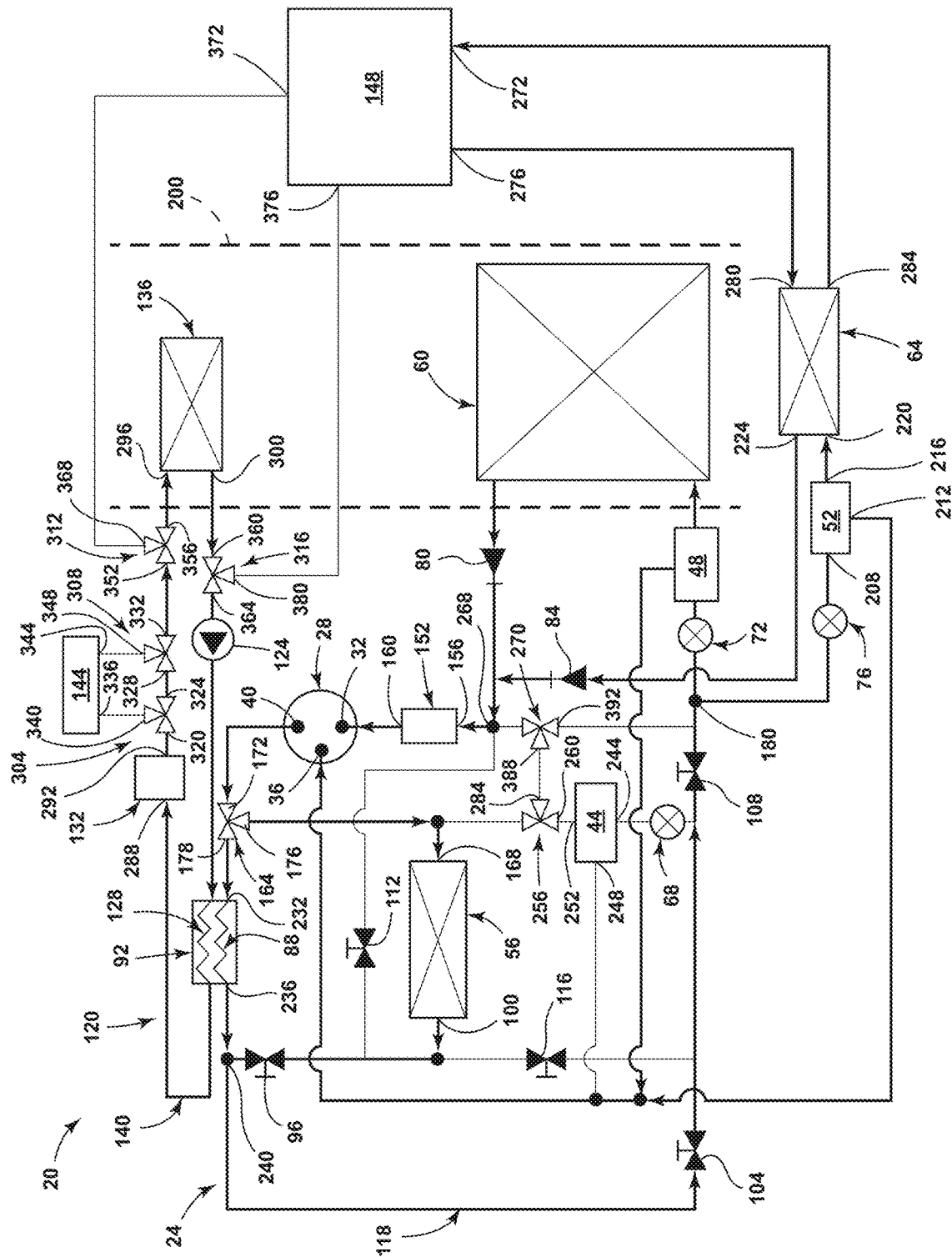
FIG. 9 is a schematic representation of the heat pump arrangement, illustrating a second reheat mode of operation, according to one example.
Figure 10:
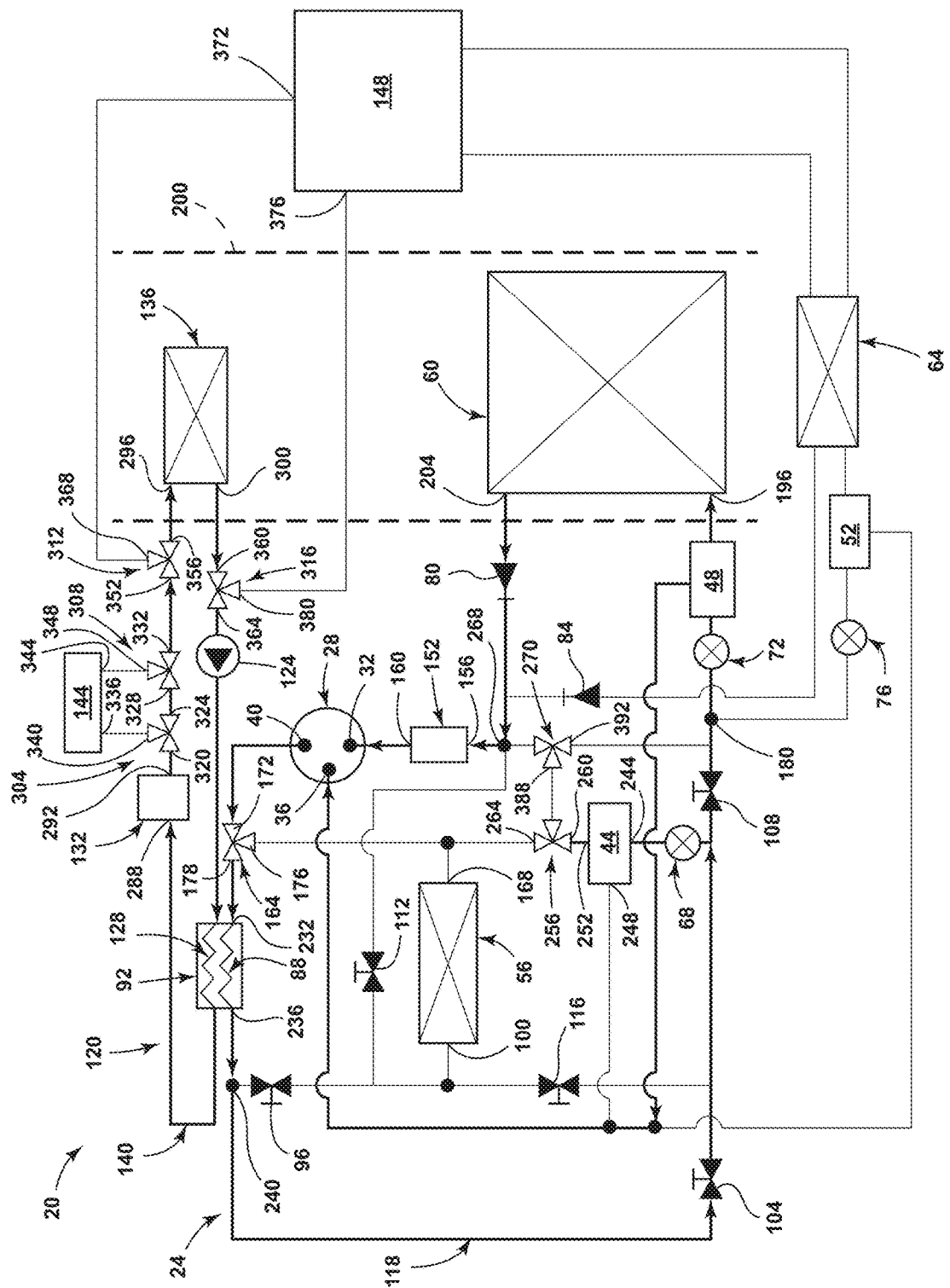
FIG. 10 is a schematic representation of the heat pump arrangement, illustrating a third reheat mode of operation, according to one example.

With specific reference to FIGS. 8 and 9, the first three-way valve 164 is positioned to direct the first heat exchange fluid received at the first port 172 to exit the first three-way valve 164 by way of the second port 176 and the third port 178. Accordingly, in these modes of operation, the first heat exchange fluid is split into a first portion and a second portion at the first three-way valve 164. The first portion of the first heat exchange fluid exits the first three-way valve 164 by way of the second port 176 thereof. The flow of the first portion from the first three-way valve 164 to the outlet 100 of the first heat exchanger 56 has been described above. From the outlet 100 of the first heat exchanger 56, the first heat exchange fluid is directed to the first shutoff valve 96, which is in the open position. The fourth shutoff valve 112 and the fifth shutoff valve 116 are each in the closed position. From the first shutoff valve 96, the first heat exchange fluid is directed to the first coupling point 240. At the first coupling point 240, first and second portions of the first heat exchange fluid are rejoined, or recombined. The flow of the second portion of the first heat exchange fluid from the third port 178 of the first three-way valve 164 will be discussed further herein.

Referring particularly to FIGS. 8-11, a variety of reheat modes of operation are depicted. More specifically, the first reheat mode of operation (FIG. 8), the second reheat mode of operation (FIG. 9), a third reheat mode of operation (FIG. 10), and a fourth reheat mode of operation (FIG. 11) are depicted in exemplary form. The compressor 28 drives the first heat exchange fluid to the first port 172 of the first three-way valve 164. As mentioned above, the positioning of the first three-way valve 164 in the modes of operation depicted in FIGS. 8 and 9 is such that the first heat exchange fluid is split into the first portion and the second portion, with the second portion being directed to exit the first three-way valve 164 by way of the third port 178. In the modes of operation depicted in FIGS. 10 and 11, an entirety of the first heat exchange fluid received at the first port 172 of the first three-way valve 164 is directed to exit the first three-way valve 164 by way of the third port 178. From the third port 178 of the first three-way valve 164, the first heat exchange fluid is directed to the inlet 232 of the first region 88 of the fourth heat exchanger 92. Within the fourth heat exchanger 92, the first heat exchange fluid thermally interacts with the second heat exchange fluid that is flowing through the coolant loop 120 by way of the second region 128 of the fourth heat exchanger 92. The first heat exchange fluid exits the first region 88 of the fourth heat exchanger 92 by way of the outlet 236 thereof. From the outlet 236 of the first region 88 of the fourth heat exchanger 92, the first heat exchange fluid is directed toward the first coupling point 240. The first coupling point 240 is downstream of the first shutoff valve 96. The first shutoff valve 96 is in the closed position in the modes of operation depicted in FIGS. 10 and 11. In the modes of operation depicted in FIGS. 8 and 9, the first shutoff valve 96 is in the open position and the first and second portions of the first heat exchange fluid are recombined, or rejoined, at the first coupling point 240. From the first coupling point 240, the first heat exchange fluid is directed toward the second shutoff valve 104. The third shutoff valve 108 is in the open position. Accordingly, from the second shutoff valve 104, the first heat exchange fluid is directed to the second expansion valve 72.

Referring again to FIGS. 8-11, the first heat exchange fluid that is received at the second expansion valve 72 decreases in pressure and temperature as a result of interaction with the second expansion valve 72. From the second expansion valve 72, the first heat exchange fluid is directed to the second vapor generator 48. The first heat exchange fluid is received at the inlet 184 of the second vapor generator 48. The second vapor generator 48 performs as already described. From the second outlet 192 of the second vapor generator 48, the first heat exchange fluid is directed to the inlet 196 of the second heat exchanger 60. The second heat exchanger 60 performs as already described. Upon exiting the second heat exchanger 60 by way of the outlet 204, the first heat exchange fluid flows through the first check valve 80. After exiting the first check valve 80, the first heat exchange fluid is directed toward the accumulator 152 by the refrigerant network of conduits 118. In the modes of operation depicted in FIGS. 8 and 10, the second check valve 84 prevents back flow toward the third heat exchanger 64. Accordingly, the third heat exchanger 64 is prevented from becoming a storage vessel for the first heat exchange fluid when the third heat exchanger 64 is not employed in a given mode of operation. The accumulator 152 receives the first heat exchange fluid and provides a gaseous component of the first heat exchange fluid to the low-pressure inlet 32 of the compressor 28, thereby completing the traversal of the refrigerant loop 24. In the modes of operation depicted in FIGS. 9 and 11, the first heat exchange fluid also flowed along the second path toward the third heat exchanger 64 at the branching point 180. The first heat exchange fluid from the second path is rejoined, or recombined, with the first heat exchange fluid from the first path prior to flowing to the accumulator 152, as already described herein.

Figure 11:
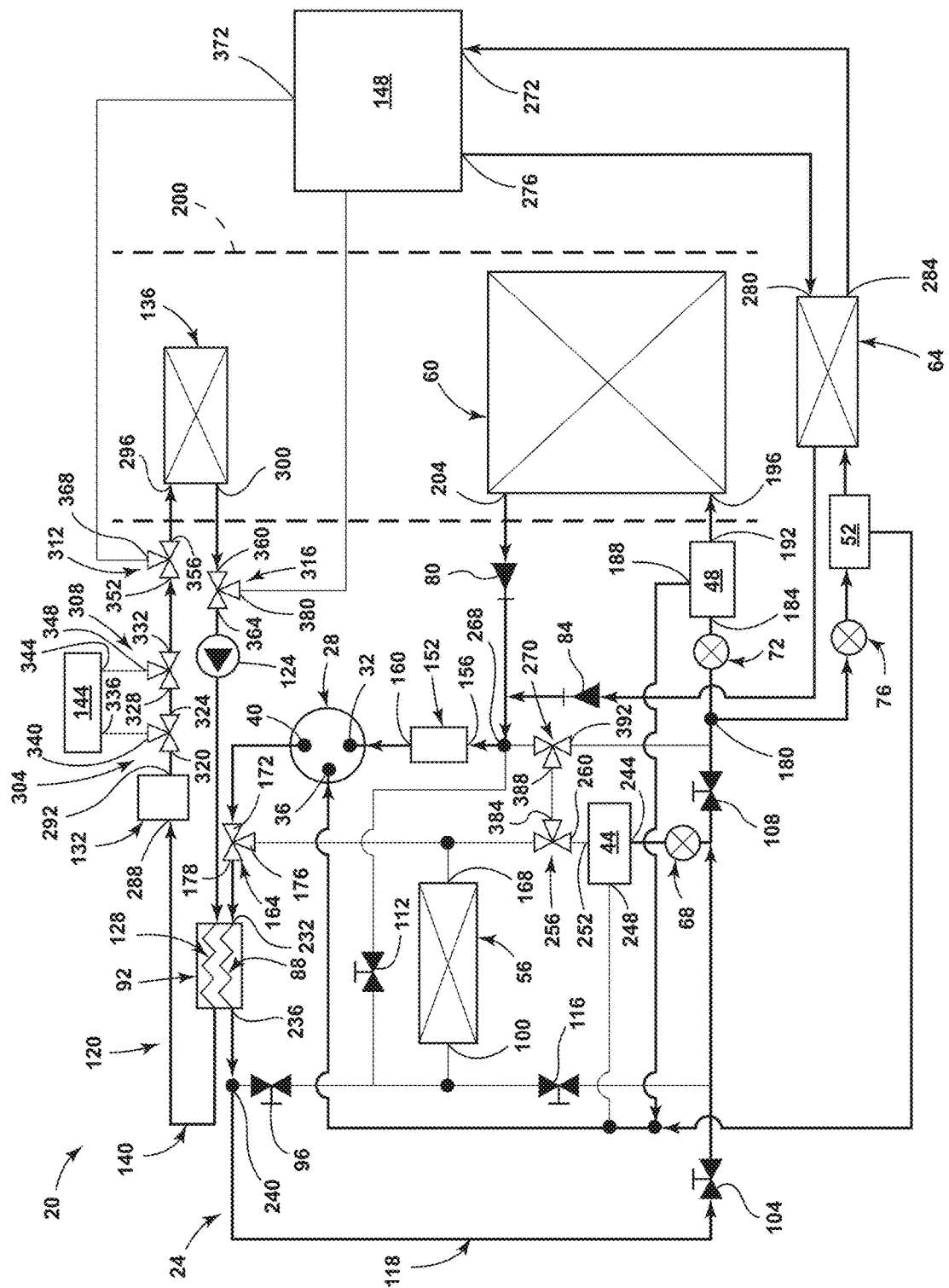
FIG. 11 is a schematic representation of the heat pump arrangement, illustrating a fourth reheat mode of operation, according to one example.

With specific reference to FIGS. 9 and 11, at the branching point 180, the refrigerant network of conduits 118 splits into the first path and the second path, with the first path leading toward the second heat exchanger 60 and the second path leading toward the third heat exchanger 64. In these modes of operation, the first heat exchange fluid is split into the first portion that follows the first path in the manner described above and the second portion that follows the second path. At least a portion of the first heat exchange fluid that encounters the branching point 180 is directed along the second path toward the third heat exchanger 64. Prior to reaching the third heat exchanger 64, the first heat exchange fluid first encounters the third expansion valve 76. The third expansion valve 76 performs as already described. From the third expansion valve 76, the first heat exchange fluid is directed to the third vapor generator 52. The first heat exchange fluid is received at the inlet 208 of the third vapor generator 52. The third vapor generator 52 performs as already described. The portion of the first heat exchange fluid that exits the third vapor generator 52 by way of the second outlet 216 is directed to the first inlet 220 of the third heat exchanger 64. The third heat exchanger 64 performs as already described.

Referring again to FIGS. 9 and 11, the second heat exchange fluid, or the third heat exchange fluid, flows between the third heat exchanger 64 and the second heat-producing component 148. The first inlet 272 of the second heat-producing component 148 receives the second heat exchange fluid, or third heat exchange fluid, from the third heat exchanger 64. The second heat-producing component 148 performs as already described. The second, or third, heat exchange fluid received at the first inlet 272 of the second heat-producing component 148 exits the second heat-producing component 148 by way of the first outlet 276 thereof. From the first outlet 276 of the second heat-producing component 148, the second, or third, heat exchange fluid is directed toward the second inlet 280 of the third heat exchanger 64. The first heat exchange fluid received at the first inlet 220 and the second, or third, heat exchange fluid received at the second inlet 280 can thermally interact with one another within the third heat exchanger 64. The second, or third, heat exchange fluid that is received at the second inlet 280 exits the third heat exchanger 64 by way of the second outlet 284 thereof. From the second outlet 284 of the third heat exchanger 64, the second, or third, heat exchange fluid is directed back toward the first inlet 272 of the second heat-producing component 148.

Referring further to FIGS. 9 and 11, the first heat exchange fluid exits the third heat exchanger 64 by way of the first outlet 224 of the third heat exchanger 64 is directed to the second check valve 84 by the refrigerant network of conduits 118. The first heat exchange fluid flows through the second check valve 84 and is directed to the accumulator 152. After exiting the second check valve 84, the second portion of the first heat exchange fluid is rejoined, or recombined, with the first portion of the first heat exchange fluid prior to reaching the accumulator 152. The accumulator 152 receives the first heat exchange fluid and performs as described above, thereby completing the traversal of the refrigerant loop 24.

Figure 12:
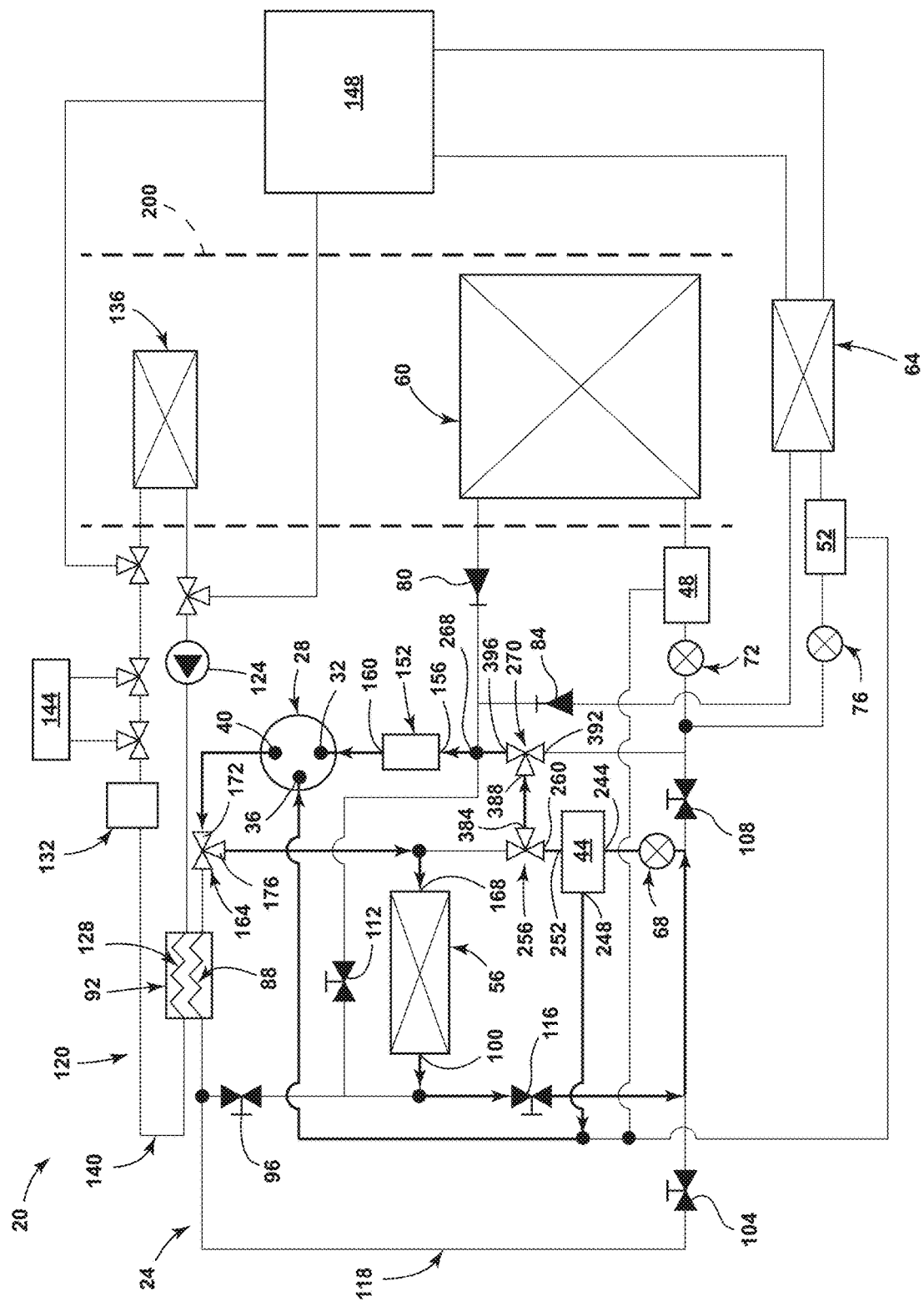
FIG. 12 is a schematic representation of the heat pump arrangement, illustrating a deice mode of operation, according to one example.

Referring now to FIG. 12, the flow of the first heat exchange fluid from the compressor 28 to the outlet 100 of the first heat exchanger 56 has already been described. In this mode of operation, the first shutoff valve 96, the second shutoff valve 104, the fourth shutoff valve 112, and the third shutoff valve 108 are each in the closed position. The fifth shutoff valve 116 is in the open position. Accordingly, from the outlet 100 of the first heat exchanger 56, the first heat exchange fluid is directed toward the fifth shutoff valve 116. From the fifth shutoff valve 116, the first heat exchange fluid is directed toward the first expansion valve 68. After passing through the first expansion valve 68, the first heat exchange fluid is directed to the first vapor generator 44. The first expansion valve 68 and the first vapor generator 44 each perform as already described. The first heat exchange fluid that exits the first vapor generator 44 by way of the second outlet 252 is directed to the first port 260 of the second three-way valve 256. The second three-way valve 256 is positioned such that the first heat exchange fluid received at the first port 260 is directed to exit the second three-way valve 256 by way of a third port 384 thereof. From the third port 384 of the second three-way valve 256, the first heat exchange fluid is directed to a first port 388 of the third three-way valve 270. The third three-way valve 270 is positioned such that the first heat exchange fluid received at the first port 388 is directed to exit the third three-way valve 270 by a third port 396 thereof. From the third port 396 of the third three-way valve 270, the first heat exchange fluid is directed to the accumulator 152. The accumulator 152 performs as already described. In various examples, this mode of operation can be employed when the first heat exchanger 56 has ice formed on an exterior thereof. Ice formation on the exterior of the first heat exchanger 56 can decrease an efficiency of thermal exchange between the first heat exchange fluid and the fluid that is external to the refrigerant loop 24 and the coolant loop 120.

Figure 13:
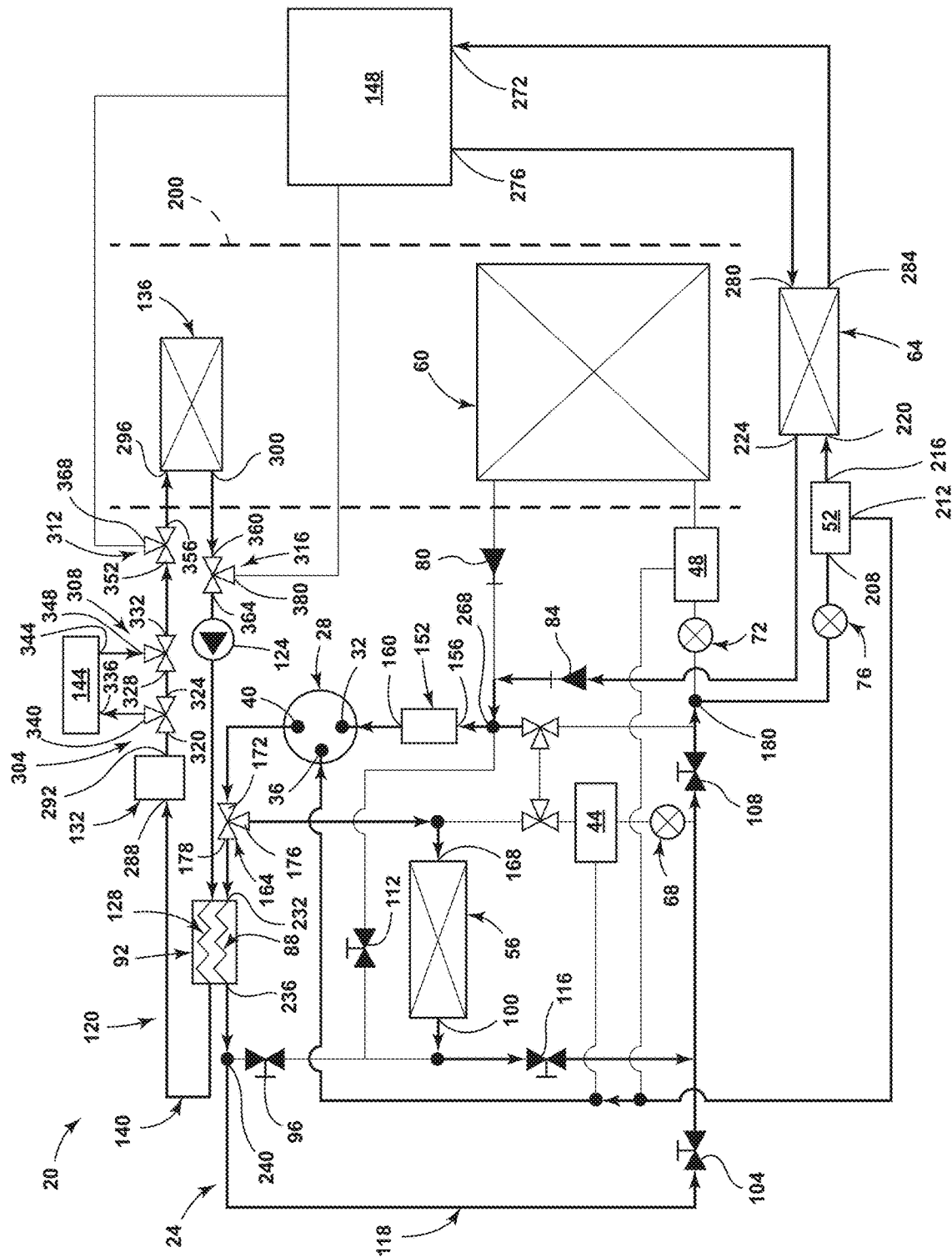
FIG. 13 is a schematic representation of a heat pump arrangement, illustrating a first deice and heat mode of operation, according to one example.
Figure 14:
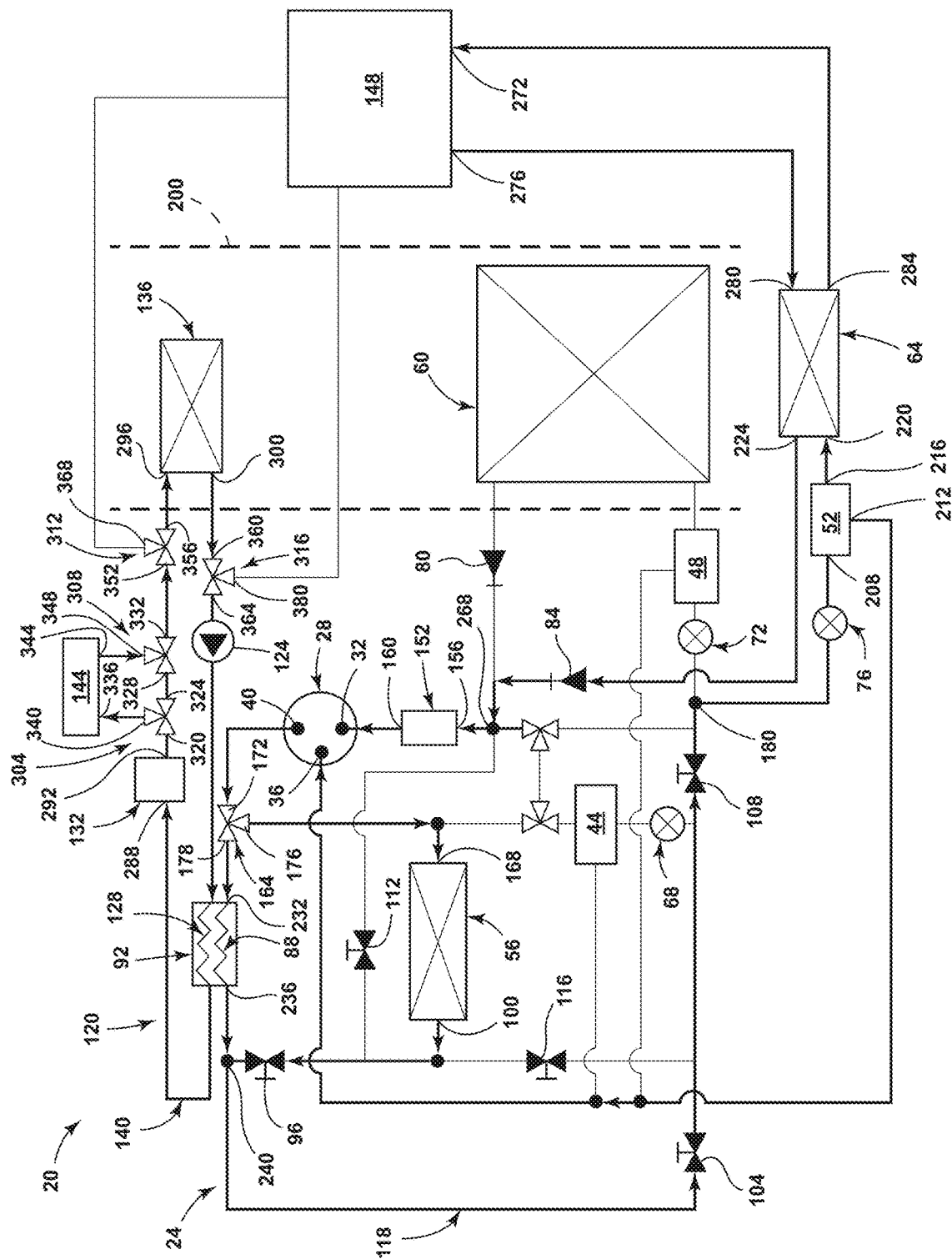
FIG. 14 is a schematic representation of the heat pump arrangement, illustrating a second deice and heat mode of operation, according to one example.

Referring to FIGS. 13 and 14, in each of these modes of operation, the compressor 28 acts upon the first heat exchange fluid to drive the first heat exchange fluid from the outlet 40 toward the first three-way valve 164. More specifically, the compressor 28 drives the first heat exchange fluid toward the first port 172 of the first three-way valve 164. The first three-way valve 164 is positioned to direct the first heat exchange fluid received at the first port 172 to exit the first three-way valve 164 by way of the second port 176 and the third port 178. Accordingly, in these modes of operation, the first heat exchange fluid is split into the first portion and the second portion at the first three-way valve 164. The first portion of the first heat exchange fluid exits the first three-way valve 164 by way of the second port 176 thereof. After exiting the second port 176 of the first three-way valve 164, the first heat exchange fluid is directed toward the inlet 168 of the first heat exchanger 56. As the first heat exchange fluid flows through the first heat exchanger 56, the first heat exchange fluid may thermally interact with a heat exchange fluid that is external to the refrigerant loop 24 and the coolant loop 120 (e.g., ambient air) such that heat may be removed from the first heat exchange fluid. The first heat exchange fluid exits the first heat exchanger 56 at the outlet 100 of the first heat exchanger 56.

Referring again to FIGS. 13 and 14, the second portion of the first heat exchange fluid exits the first three-way valve 164 by way of the third port 178. After exiting the third port 178 of the first three-way valve 164, the first heat exchange fluid is directed toward the inlet 232 of the first region 88 of the fourth heat exchanger 92. Within the fourth heat exchanger 92, the first heat exchange fluid thermally interacts with the second heat exchange fluid that is flowing through the coolant loop 120 by way of the second region 128 of the fourth heat exchanger 92. The first heat exchange fluid exits the first region 88 of the fourth heat exchanger 92 by way of the outlet 236 thereof. From the outlet 236 of the first region 88 of the fourth heat exchanger 92, the first heat exchange fluid is directed toward the first coupling point 240.

Referring further to FIGS. 13 and 14, the pump 124 is activated in these modes of operation such that the second heat exchange fluid is circulated through the components of the coolant loop 120. The second heat exchange fluid is driven from the pump 124 toward the fourth heat exchanger 92. Accordingly, the second heat exchange fluid thermally interacts with the first heat exchange fluid by way of the fourth heat exchanger 92. More specifically, the second heat exchange fluid is circulated through the second region 128 of the fourth heat exchanger 92 while the first heat exchange fluid is circulated through the first region 88 of the fourth heat exchanger 92. In various examples, the second heat exchange fluid may extract heat from the first heat exchange fluid at the fourth heat exchanger 92. From the fourth heat exchanger 92, the second heat exchange fluid is directed to the inlet 288 of the reservoir 132 by the coolant network of conduits 140. The reservoir 132 can accumulate the second heat exchange fluid. The outlet 292 of the reservoir 132 is plumbed to the inlet 296 of the fifth heat exchanger 136 by the coolant network of conduits 140. The fourth three-way valve 304, the fifth three-way valve 308, and the sixth three-way valve 312 are positioned between the outlet 292 of the reservoir 132 and the inlet 296 of the fifth heat exchanger 136.

Referring still further to FIGS. 13 and 14, from the outlet 292 of the reservoir 132, the second heat exchange fluid is directed to the first port 320 of the fourth three-way valve 304. In each of these modes of operation, the fourth three-way valve 304 is positioned such that the second heat exchange fluid received at the first port 320 is directed to exit the fourth three-way valve 304 by way of the third port 340 thereof. From the third port 340 of the fourth three-way valve 304, the second heat exchange fluid is directed toward the inlet 336 of the first heat-producing component 144. The first heat-producing component 144 can be an engine, electronics, battery, battery pack, one or more heating elements, brakes, or the like. After interacting with the first heat-producing component 144, the second heat exchange fluid exits the first heat-producing component 144 by way of the outlet 344 thereof. As a result of interaction with the first heat-producing component 144, the second heat exchange fluid that exits by way of the outlet 344 may have a greater pressure and/or a greater temperature than the second heat exchange fluid that entered by way of the inlet 336. From the outlet 344 of the first heat-producing component 144, the second heat exchange fluid is directed to the third port 348 of the fifth three-way valve 308. Based upon a positioning of the fifth three-way valve 308, the second heat exchange fluid received at the third port 348 is directed to exit the fifth three-way valve 308 by way of the second port 332 thereof. From the second port 332 of the fifth three-way valve 308, the second heat exchange fluid is directed to the first port 352 of the sixth three-way valve 312. The positioning of the sixth three-way valve 312 in these modes of operation is such that the second heat exchange fluid received at the first port 352 is directed to exit the sixth three-way valve 312 by way of the second port 356 thereof.

Referring yet again to FIGS. 13 and 14, the second heat exchange fluid that exits the sixth three-way valve 312 by way of the second port 356 thereof is directed to the inlet 296 of the fifth heat exchanger 136. While in the fifth heat exchanger 136, the heat carried by the second heat exchange fluid can be employed in the manner outlined above (e.g., to heat a cabin of a vehicle). The second heat exchange fluid exits the fifth heat exchanger 136 by way of the outlet 300. From the outlet 300, the second heat exchange fluid is directed toward the first port 360 of the seventh three-way valve 316. In each of these modes of operation, the seventh three-way valve 316 is positioned such that the second heat exchange fluid received at the first port 360 is directed to exit the seventh three-way valve 316 by way of the second port 364 thereof. From the second port 364 of the seventh three-way valve 316, the second heat exchange fluid is directed to the pump 124, thereby completing traversal of the coolant loop 120 in these modes of operation. In each of these modes of operation, the first heat exchanger 56 may be deiced and the fifth heat exchanger 136 may provide heat to air flowing through the ductwork 200. The air heated within the ductwork 200 may be employed to heat a cabin of a vehicle.

With specific reference to FIG. 13, the first shutoff valve 96 and the fourth shutoff valve 112 are each in the closed position. The second shutoff valve 104, the third shutoff valve 108, and the fifth shutoff valve 116 are each in the open position. Accordingly, the first portion of the first heat exchange fluid is directed toward the fifth shutoff valve 116 after exiting the first heat exchanger 56 by way of the outlet 100. The second portion of the first heat exchange fluid passes through the first coupling point 240 and is directed to the second shutoff valve 104. The first portion and the second portion of the first heat exchange fluid are recombined, or rejoined, downstream of the second shutoff valve 104 and downstream of the fifth shutoff valve 116. After being recombined, or rejoined, the first heat exchange fluid is directed to the third shutoff valve 108.

Referring particularly to FIG. 14, the first shutoff valve 96, the second shutoff valve 104, and the third shutoff valve 108 are each in the open position. The fourth shutoff valve 112 and the fifth shutoff valve 116 are each in the closed position. Accordingly, the first portion of the first heat exchange fluid is directed toward the first shutoff valve 96 after exiting the first heat exchanger 56 by way of the outlet 100. After flowing through the first shutoff valve 96, the first heat exchange fluid is directed to the first coupling point 240. At the first coupling point 240, the first and second portions of the first heat exchange fluid are rejoined, or recombined. From the first coupling point 240, the first heat exchange fluid is directed to the second shutoff valve 104. After flowing through the second shutoff valve 104, the first heat exchange fluid is directed to the third shutoff valve 108.

Referring further to FIGS. 13 and 14, the first expansion valve 68 and the second expansion valve 72 each operate as shutoff valves in these modes of operation such that the first heat exchange fluid does not flow through either the first expansion valve 68 or the second expansion valve 72. Accordingly, from the third shutoff valve 108, the first heat exchange fluid is directed toward the third expansion valve 76 at the branching point 180. The first heat exchange fluid decreases in pressure and temperature as a result of interaction with the third expansion valve 76. From the third expansion valve 76, the first heat exchange fluid is directed to the third vapor generator 52. The first heat exchange fluid is received at the inlet 208 of the third vapor generator 52. The third vapor generator 52 performs as already described. From the second outlet 216 of the third vapor generator 52, the first heat exchange fluid is directed to the first inlet 220 of the third heat exchanger 64. The third heat exchanger 64 performs as described above. From the first outlet 224 of the third heat exchanger 64, the first heat exchange fluid is directed to the second check valve 84 by the refrigerant network of conduits 118. The first heat exchange fluid flows through the second check valve 84 and is directed to the accumulator 152. The accumulator 152 performs as already described. The first check valve 80 prevents back flow toward the second heat exchanger 60. Accordingly, the second heat exchanger 60 is prevented from becoming a storage vessel for the first heat exchange fluid when the second heat exchanger 60 is not employed in a given mode of operation.

The present disclosure has discussed a variety of modes of operation and various examples for the heat pump 20. While specific examples of the heat pump 20 and specific examples of the modes of operation of such heat pumps 20 have been discussed in detail, the present disclosure is not limited to the arrangements of the heat pump 20 discussed herein. Similarly, the present disclosure is not limited to the modes of operation discussed herein. Rather, the present disclosure provides exemplary discussion of the operation of the various components of the heat pumps 20 that may inform additional modes of operation and/or arrangements that are not explicitly articulated herein.

Modifications of the disclosure will occur to those skilled in the art and to those who make or use the concepts disclosed herein. Therefore, it is understood that the embodiments shown in the drawings and described above are merely for illustrative purposes and not intended to limit the scope of the disclosure, which is defined by the following claims as interpreted according to the principles of patent law, including the doctrine of equivalents.

It will be understood by one having ordinary skill in the art that construction of the described concepts, and other components, is not limited to any specific material. Other exemplary embodiments of the concepts disclosed herein may be formed from a wide variety of materials, unless described otherwise herein.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, and the nature or numeral of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes, or steps within described processes, may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further, it is to be understood that such concepts are intended to be covered by the following claims, unless these claims, by their language, expressly state otherwise.

What is claimed is:

1. A heat pump, comprising:
a refrigerant loop comprising:
   a compressor having a low-pressure inlet, a mid-pressure inlet, and an outlet;
   a first vapor generator;
   a second vapor generator;
   a third vapor generator, wherein the first vapor generator, the second vapor generator, and the third vapor generator are each positioned downstream of the outlet of the compressor, and wherein the first vapor generator, the second vapor generator, and the third vapor generator are each positioned upstream of the mid-pressure inlet of the compressor;
   a first heat exchanger positioned downstream of the first vapor generator;
   a second heat exchanger positioned downstream of the second vapor generator;
   a third heat exchanger positioned downstream of the third vapor generator;
   a first expansion valve positioned immediately upstream of the first vapor generator;
   a second expansion valve positioned immediately upstream of the second vapor generator; and
   a third expansion valve positioned immediately upstream of the third vapor generator.

2. The heat pump of claim 1, wherein the refrigerant loop further comprises:
   a first check valve positioned immediately downstream of the second heat exchanger; and
   a second check valve positioned immediately downstream of the third heat exchanger.

3. The heat pump of claim 1, wherein the refrigerant loop further comprises:
   an accumulator having an inlet and an outlet, wherein the outlet of the accumulator is immediately upstream of the low-pressure inlet of the compressor.

4. The heat pump of claim 1, wherein the refrigerant loop further comprises:
   a first region of a fourth heat exchanger.

5. The heat pump of claim 4, further comprising:
a coolant loop comprising:
   a pump;
   a second region of the fourth heat exchanger;
   a reservoir;
   a fifth heat exchanger; and
   a coolant network of conduits that fluidly couples components of the coolant loop.

6. The heat pump of claim 5, further comprising:
a first heat-producing component positioned downstream of the reservoir and upstream of the fifth heat exchanger.

7. The heat pump of claim 6, further comprising:
a second heat-producing component plumbed in parallel with the fifth heat exchanger.

8. The heat pump of claim 7, wherein the second heat-producing component is in direct fluid communication with the third heat exchanger.

9. A heat pump comprising:
a refrigerant loop comprising:
   a compressor having a low-pressure inlet, a mid-pressure inlet, and an outlet;
   a first vapor generator;
   a second vapor generator;
   a third vapor generator, wherein the first vapor generator, the second vapor generator, and the third vapor generator are each positioned downstream of the outlet of the compressor, and wherein the first vapor generator, the second vapor generator, and the third vapor generator are each positioned upstream of the mid-pressure inlet of the compressor;
   a first heat exchanger positioned downstream of the first vapor generator;
   a second heat exchanger positioned downstream of the second vapor generator;
   a third heat exchanger positioned downstream of the third vapor generator;
   a first shutoff valve positioned immediately downstream of an outlet of the first heat exchanger;
   a second shutoff valve positioned immediately downstream of the first shutoff valve; and
   a third shutoff valve positioned immediately downstream of the second shutoff valve.

10. The heat pump of claim 9, wherein the refrigerant loop further comprises:
   a fourth shutoff valve positioned immediately downstream of the outlet of the first heat exchanger; and
   a fifth shutoff valve positioned immediately downstream of the outlet of the first heat exchanger.

11. A heat pump, comprising:
a refrigerant loop comprising:
   a compressor having a low-pressure inlet, a mid-pressure inlet, and an outlet;
   a first vapor generator;
   a first heat exchanger positioned downstream of the first vapor generator;
   a second vapor generator;
   a second heat exchanger positioned downstream of the second vapor generator;
   a third vapor generator;
   a third heat exchanger positioned downstream of the third vapor generator, wherein the first vapor generator, the second vapor generator, and the third vapor generator are each positioned downstream of the outlet of the compressor, and wherein the first vapor generator, the second vapor generator, and the third vapor generator are each positioned upstream of the mid-pressure inlet of the compressor;
   a first check valve positioned immediately downstream of the second heat exchanger; and
   a second check valve positioned immediately downstream of the third heat exchanger.

12. The heat pump of claim 11, wherein the refrigerant loop further comprises:
   a first expansion valve positioned immediately upstream of the first vapor generator;
   a second expansion valve positioned immediately upstream of the second vapor generator; and
   a third expansion valve positioned immediately upstream of the third vapor generator.

13. The heat pump of claim 11, wherein the refrigerant loop further comprises:
   a first shutoff valve positioned immediately downstream of an outlet of the first heat exchanger;
   a second shutoff valve positioned immediately downstream of the first shutoff valve;
   a third shutoff valve positioned immediately downstream of the second shutoff valve;
   a fourth shutoff valve positioned immediately downstream of the outlet of the first heat exchanger; and a fifth shutoff valve positioned immediately downstream of the outlet of the first heat exchanger.

14. The heat pump of claim 11, wherein the refrigerant loop further comprises:
an accumulator having an inlet and an outlet, wherein the outlet of the accumulator is immediately upstream of the low-pressure inlet of the compressor.

15. The heat pump of claim 11, wherein the refrigerant loop further comprises:
a first region of a fourth heat exchanger.

16. The heat pump of claim 15, further comprising:
a coolant loop comprising:
a pump;
a second region of the fourth heat exchanger;
a reservoir;
a fifth heat exchanger; and
a coolant network of conduits that fluidly couples components of the coolant loop.

17. The heat pump of claim 16, further comprising:
a first heat-producing component positioned downstream of the reservoir and upstream of the fifth heat exchanger; and
a second heat-producing component plumbed in parallel with the fifth heat exchanger, wherein the second heat-producing component is in direct fluid communication with the third heat exchanger.

\* \* \* \* \*